(12) United States Patent
Britsom et al.

(10) Patent No.: US 7,857,531 B2
(45) Date of Patent: Dec. 28, 2010

(54) PRINTING DEVICE INCLUDING A USER INPUT SECTION HAVING TIME DEPENDENT SELECTION KEYS

(75) Inventors: Dirk Van Britsom, Temse (BE); Jos Vleurinck, Oordegem (BE)

(73) Assignee: Dymo, Sint-Niklaas (BE)

( * ) Notice: Subject to any disclaimer, the term of this patent is extended or adjusted under 35 U.S.C. 154(b) by 838 days.

(21) Appl. No.: 11/208,890

(22) Filed: Aug. 23, 2005

(65) Prior Publication Data
US 2006/0093422 A1 May 4, 2006

(30) Foreign Application Priority Data
Aug. 24, 2004 (GB) ............................. 0418897.5

(51) Int. Cl.
*B41J 11/44* (2006.01)
(52) U.S. Cl. .................... 400/76; 400/62; 400/89; 400/109
(58) Field of Classification Search .............. 400/62, 400/76, 89, 109, 109.1, 110, 111
See application file for complete search history.

(56) References Cited

U.S. PATENT DOCUMENTS

| 6,212,412 B1 | 4/2001 | Rogers et al. |
| 2003/0110441 A1 | 6/2003 | Tsukuda et al. |

FOREIGN PATENT DOCUMENTS

| EP | 0 267 890 | 5/1988 |
| EP | 0 322 918 | 7/1989 |
| EP | 0 322 919 | 7/1989 |
| EP | 0 513 290 | 11/1992 |
| EP | 0 564 297 | 10/1993 |
| EP | 0 578 372 | 1/1994 |
| EP | 0 634 274 | 1/1995 |
| EP | 1241014 A1 * | 9/2002 |
| WO | WO 9965212 A1 * | 12/1999 |

OTHER PUBLICATIONS

Extended European search report from European patent application 05255200.7, dated Feb. 3, 2010.

* cited by examiner

*Primary Examiner*—Ren Yan
*Assistant Examiner*—Matthew G Marini
(74) *Attorney, Agent, or Firm*—Marshall, Gerstein & Borun LLP

(57) ABSTRACT

A printing device for printing labels comprising: a memory for storing one or more character sets, each character set including at least a principle character and an additional character which is associated with the principle character; user input means having character selection keys for selecting a character set to define an image to be printed by the printing device; and a controller for accessing characters from the memory to be displayed and printed which correspond to characters selected at the user input means; wherein actuation of a character selection key selects the principle character in the selected character set and maintaining activation of the character selection key for a predetermined time period selects the associated additional character.

16 Claims, 8 Drawing Sheets

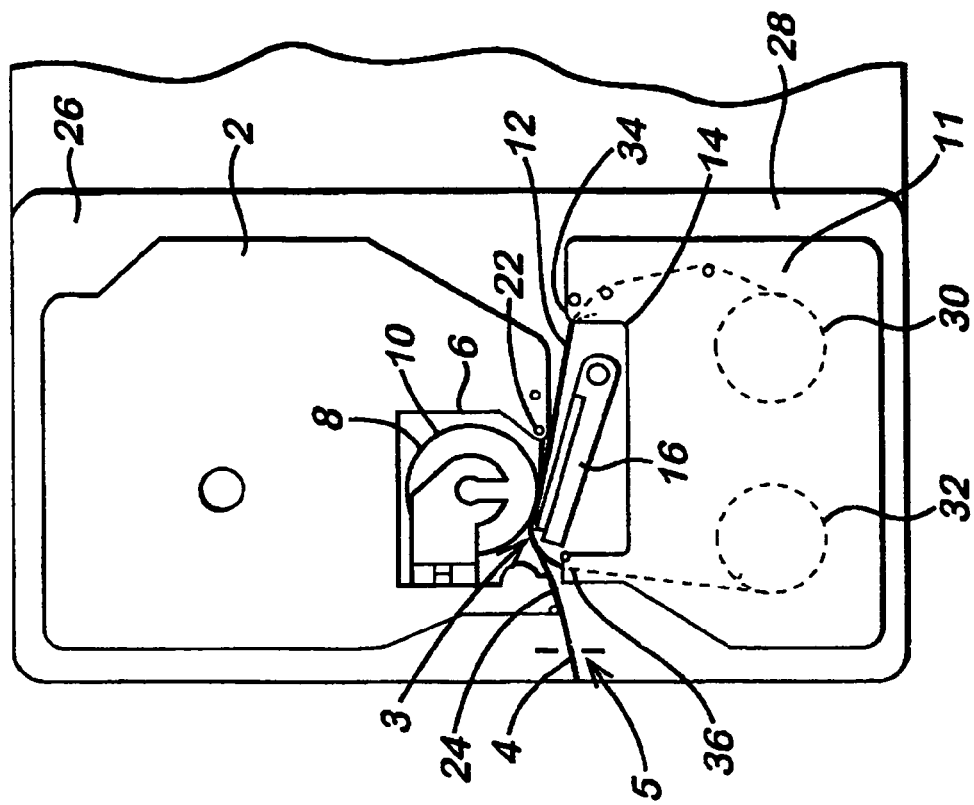
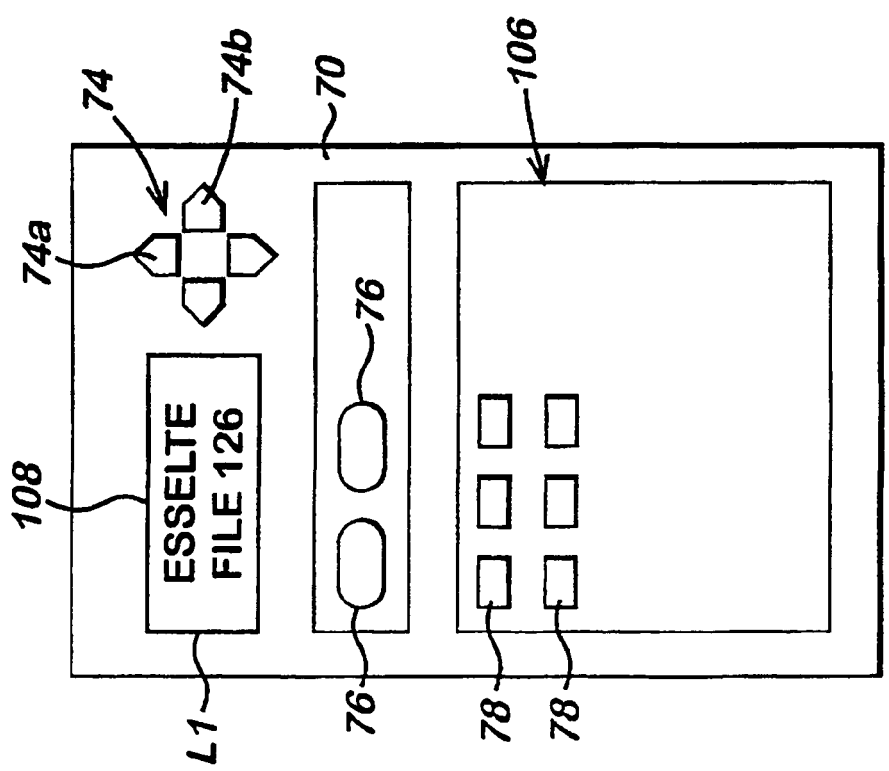

Fig. 8
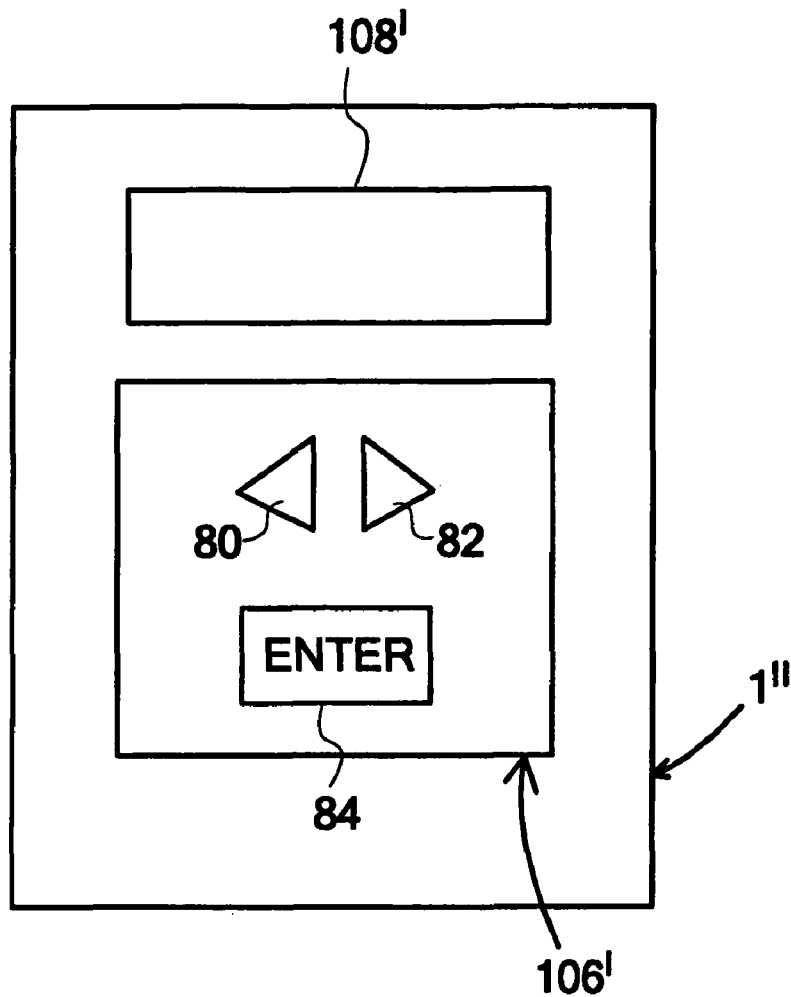
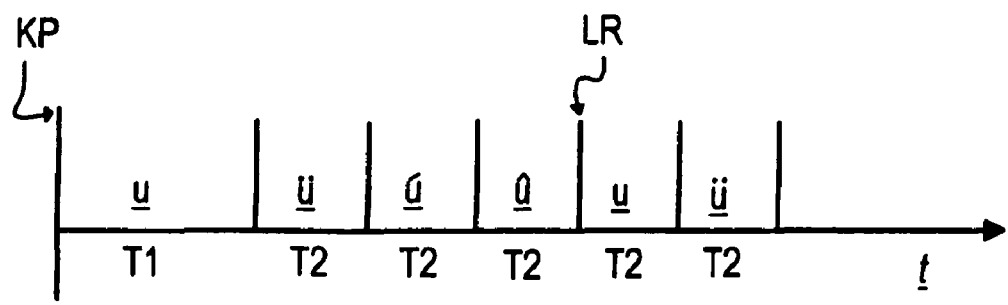
Fig. 9

R: Release less than a predetermined time t3
A: Activation

R: Release less than a predetermined time t3
A: Activation
Y: Release less than a predetermined time t1

PRINTING DEVICE INCLUDING A USER INPUT SECTION HAVING TIME DEPENDENT SELECTION KEYS

This application claims priority to Great Britain Application No. GB0418897.5, filed Aug. 24, 2004.

FIELD OF THE INVENTION

The present invention relates to a printing device and in particular but not exclusively to a tape printing device for printing an image on a tape.

BACKGROUND

Known tape printing apparatus of the type with which the present invention is concerned are disclosed in EP-A-322918 and EP-A-322919 (Brother Kogyo Kabushiki Kaisha) and EP-A-267890 (Varitronic). The printers each include a printing device having a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

The devices of the type described above are provided with a keyboard which enables a user to enter characters, symbols and the like to form an image to be printed by the tape printer. The keyboard usually has text character keys and number keys for entering letters and number keys respectively, plus some function keys which, among other things, operate menus and allow printing attributes to be set.

For a printer to be used with the English language, a maximum of 26 text character keys are required, one for each letter of the alphabet. However, if the printer is to be used with other European languages, provision must be made to allow the user to specify letters with accents. For example, in the French language, "é" and "è" are required in addition to the ordinary "e". In some European languages, a significant number of accented characters are required. This results in at least two problems.

Firstly, many machines are provided with additional text character keys to the standard 26 within the keyboard so as to enable the user to easily select the accented characters. This results in more space being taken up on the keyboard with text character keys, which means either a larger keyboard is required, which may not be convenient, particularly for a compact hand-held machine, and/or less space is available on the keyboard for function keys, which means that more keystrokes may be required to execute certain functions. Alternatively, the user may need to use a large number of keystrokes to access menus to enable selection of the required character, which is time consuming and complicated for the user.

Secondly, different accented characters are required for different European languages, which can mean that different keyboards are required for the same machine in dependence on the country in which it is to be sold. This makes manufacture more complicated and expensive. Furthermore, different memory chips and microprocessors may be required for different countries which provide the different menu sequences and store different sets of characters. Again, this complicates manufacture and increases production costs.

It would be desirable to provide a printer which enables a user to access accented characters in a number of European languages using a small number of straightforward keystrokes.

SUMMARY OF THE INVENTION

According to a first aspect of the present invention, there is provided a printing device for printing labels comprising:
- a memory for storing one or more character sets, each character set including at least a principle character and an additional character which is associated with the principle character;
- user input means having character selection keys for selecting a character set to define an image to be printed by the printing device; and
- a controller for accessing characters from the memory to be displayed and printed which correspond to characters selected at the user input means;
- wherein actuation of a character selection key selects the principle character in the selected character set and maintaining activation of the character selection key for a predetermined time period allows selection of the associated additional character.

The character can be selected for display and printing automatically on release of the key after the predetermined period, or can be displayed and selected by depression of a separate enter key. That is, maintaining activation of the character selection key allows the character to be selected.

Often, further additional characters are associated with the principle character and subsequent activation of the character selection key, after the character selection key is released after said predetermined time period, allows selection of said further additional characters.

Conveniently, maintaining activation of the character selection key for a predetermined time period selects the associated additional character. In this case, when further additional characters are associated with the principle character, maintaining activation of the character selection key for further predetermined time periods may select the further additional characters.

Conveniently, the printing device further comprises a display configured to display selected characters.

Usually, there is a single one of said character sets associated with each one of said character selection keys.

Preferably, the principle characters are letters and the additional character is an accented version of the letter with which it is associated.

Preferably, the further additional characters are accented versions of the letter with which they are associated and are different from the additional character.

More preferably, different character sets comprise additional characters having different accents and further additional characters having different accents, and a different number of further additional characters.

The printing device may advantageously comprise a caps lock key, wherein if the caps lock key is activated, subsequent activation of one or more character keys selects uppercase letters. Preferably, the caps lock key is a toggle key such that if the caps lock key is activated again, subsequent activation of one or more character keys selects lowercase letters.

The printing device may advantageously comprise a shift key, wherein if the shift key is held activated, subsequent activation of one or more character keys selects uppercase letters.

Suitably, the memory stores a plurality of character groups, each character group comprising one or more character sets. It is usual for the principle characters of different groups to be identical. Furthermore, the principle characters in different groups can have additional characters and further additional characters associated with them which have different accents from those associated with the principal characters of other groups and different numbers of further additional characters.

Preferably, some principle characters of some groups have no additional character associated with them and these principle characters differ between groups.

Conveniently, the character sets of each character group include an alphabet and the additional characters and further additional characters are accented versions of the principle characters which exist in the alphabet which the character sets include. Suitably, each alphabet corresponds to a different language.

Preferably, the user input means further comprises a group selection key for choosing a character group from which to create an image.

Conveniently, the display is further configured, before the end of the predetermined time period, to temporarily display the character which would be selected if the maintaining activation did not occur.

According to a second aspect of the present invention, there is provided a method of printing characters on a label comprising the steps of:

storing in a memory one or more character sets, each character set including at least a principle character and an additional character which is associated with the principle character;

using character selection keys, selecting a character set to define an image to be printed by the printing device; and accessing characters from the memory to be displayed and printed which correspond to characters selected;

wherein actuation of a character selection key selects the principle character in the selected character set and maintaining activation of the character selection key in a predetermined time frame selects the associated additional character.

According to a third aspect of the present invention, there is provided a printing device for printing labels comprising:

a memory for storing one or more character sets, each character set including at least a principle character and an additional character which is associated with the principle character;

user input means having character selection keys for selecting a character set to define an image to be printed by the printing device; and a controller for accessing characters from the memory to be displayed and printed which correspond to characters selected at the user input means;

wherein a character selection key has a first mode of operation in which said principle character associated with said character selection key is selected and a second mode of operation in which an additional character associated with the principle character can be selected.

Preferably, said second mode is entered by activation of said character selection key for a predetermined time. In said second mode only said at least one additional character may be selectable. Alternatively, in said second mode, at least one additional character and said principle character may be selectable.

Conveniently, in said second mode a list of available characters is displayed. Preferably, said list of available characters are displayed in turn. More preferably, said list of available characters are displayed in turn if activation of said character selection key is maintained. Alternatively, said list of available characters are displayed in turn with the character displayed changing with each activation of said character selection key.

Conveniently, a display is provided, said display having a region in which a plurality of characters associated with said character selection key are displayed.

Preferably, a display is provided having an edit region for displaying the character currently available for selection resulting from said activation of said character selection key and at least one other region for displaying at least one other character associated with said character selection key.

Other objects, features, and advantages of the present invention will become apparent from the following detailed description, the accompanying drawings, and the appended claims.

BRIEF DESCRIPTION OF THE DRAWINGS

For a better understanding of the present invention and as to how the same may be carried into effect, reference will now be made by way of example to the accompanying drawings in which:

FIG. 1 is a schematic diagram of the front part of the casing of a printing device;

FIG. 2 is a plan view of a first tape printing device embodying the present invention using a two cassette system;

FIG. 8 is a schematic diagram of the front part of the casing of an alternative printing device;

FIG. 9 is a timing diagram for keypresses;

DETAILED DESCRIPTION OF THE ILLUSTRATED EMBODIMENT(S)

Figure 3:
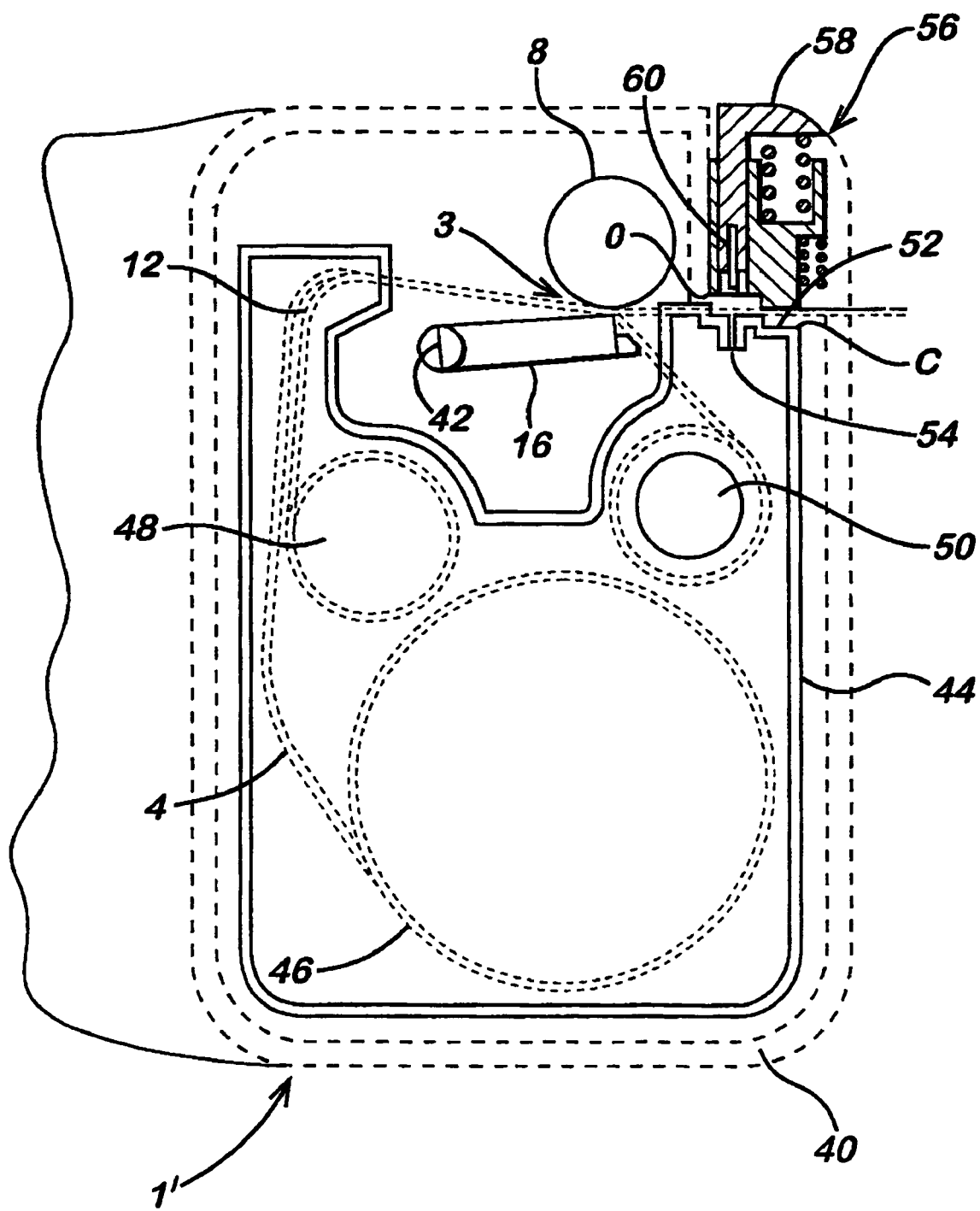
FIG. 3 is a plan view of a second tape printing device embodying the present invention, using a one cassette system.

In the figures, like reference numerals indicate like parts. FIG. 1 illustrates the front of a tape printing device. Reference numeral 70 denotes the casework of the printer. The front of the printer carries a liquid crystal display (LCD) 108 and a keyboard 106 having a plurality of cursor control keys 74, a plurality of function keys 76, only two of which are illustrated in FIG. 1, and a plurality of character selecting keys 78, only six of which are illustrated in FIG. 1. There is provided one key for each letter of the alphabet, and one key for each number from 0 to 9 and there may be additional keys such as operand keys and punctuation keys. Thus the keyboard 106 is used for inputting characters to the tape printing device. This could be achieved with other input means, for example a touch pad or a touch screen. The function keys include a return key, a save key, a recall key, a delete key, an edit key, a shift key, a caps lock key, a language key and a print key. As is known, combinations of keys can be used in place of individual keys for each function. The display can display two lines of text. Other embodiments may be able to display more or less than two lines of text. The display is illustrated displaying the two line label (L1) ESSELTE (first line) FILE 126 (second line). As is known, the character selecting keys 78 allow characters to be selected by a user to formulate labels to be printed. The term "characters" in the following refers to numerals, symbols, icons, background patterns, barcodes and similar as well as text characters, which together may make up an image to be printed on a label. The function keys 76 allow different functions to be implemented, and in effect control the operational modes of the printer. In particular, the use of the language function key will be described below.

The printer operates with a supply of tape on which images are printed. Lengths of the tape are cut off after a label has been printed. The tape is housed in a cassette which is held in a cassette bay on the underside of the printer. The cassette could be located in a different location as necessary.

Typically, this tape printing device 1 is a hand held or small desk top device which is powered by batteries at least part of the time.

FIG. 2 shows in plan view, with the outer casing depicted in FIG. 1 removed, the first tape printing device embodying the present invention which has two cassettes arranged therein. The upper cassette 2 is located in a first cassette receiving portion 26 and contains a supply of image receiving tape 4 which passes through a print zone 3 of the tape printing device 1 to an outlet 5 of the tape printing device 1. The image receiving tape 4 comprises an upper layer for receiving a printed image on one of its surfaces and has its other surface coated with an adhesive layer to which is secured a releasable backing layer. The upper cassette 2 has a recess for accommodating a platen 8 of the tape printing device 1, and guide portions 22 and 24 for guiding the tape through the print zone 3. The platen 8 is mounted for rotation within a cage moulding 10. Alternatively, the platen could be mounted for rotation on a pin.

The lower cassette 11 is located in a second cassette receiving portion 28 and contains a thermal transfer ribbon 12 which extends from a supply spool 30 to a take up spool 32 within the cassette 11. The thermal transfer ribbon 12 extends through the print zone 3 in overlap with the image receiving tape 4. The cassette 11 has a recess 14 for receiving a print head 16 of the tape printing device 1 and guide portions 34 and 36 for guiding the thermal transfer ribbon 12 through the print zone 3. The print head 16 is movable between an operative position shown in FIG. 2, in which it is in contact with the platen 8 and holds the thermal transfer ribbon 12 and the image receiving tape 4 in overlap between the print head 16 and the platen 8 and in an inoperative position in which it is moved away from the platen 8 to release the thermal transfer ribbon 12 and image receiving tape 4. In the operative position, the platen 8 is rotated to cause the image receiving tape 12 to be driven past the print head 16 and the print head 16 is controlled to print an image on the image receiving tape 4 by thermal transfer of ink from the ribbon 12.

Figure 4:
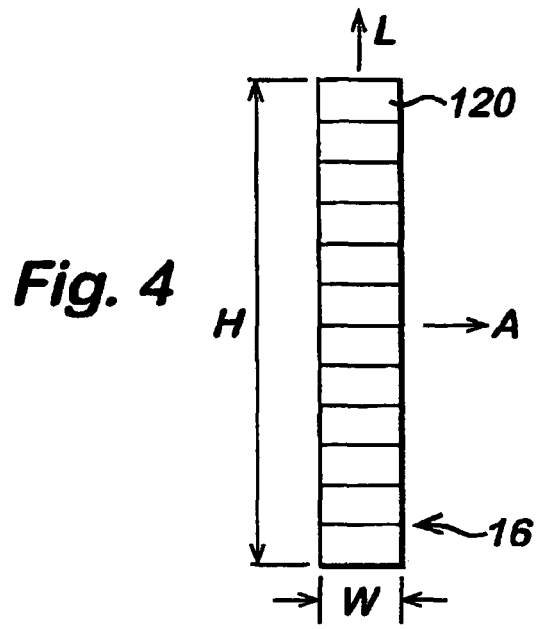
FIG. 4 shows a schematic view of the print head of FIG. 2 or FIG. 3.

The thermal print head 16 is shown in FIG. 4 and comprises a column of printing elements 120. The print head 16 has a height H which is large enough to print on the widest width of tape. The print head 16 has a width which is equal to the width of one printing element. Each of the printing elements is activatable separately and is activated in accordance with the desired image to be printed. An image can be printed with the width of the characters extending along the length of the tape, or with the height of the characters extending along the length of the tape (vertical printing).

The tape printing device 1 has a lid (which is not shown) but which is hinged along the rear of the cassette receiving portions 26 and 28 and which covers both cassettes when in place.

A dc motor 7 (see FIG. 5) continuously drives the platen 8. The platen is arranged to drive the image receiving tape 4 through the print zone 3 by the actuation of its own rotation.

The image is printed by the print head 16 on the image receiving tape on a column-by-column basis with the columns being adjacent one another in the direction of movement of the tape 4.

FIG. 3 illustrates in plan view a cassette bay of a second printing device 1' embodying the present invention which uses a one cassette system. It has its outer casing as depicted in FIG. 1 removed. The cassette bay is shown by the dotted line 40. The cassette bay 40 includes a thermal print head 16 and a platen 8 which cooperate to define a print zone 3. The thermal print head 16 is the same as that discussed in relation to FIG. 2 and shown in FIG. 4.

The print head 16 is pivotable about a pivot point so that it can be brought into contact with the platen 8 for printing and moved away from the platen 8 to enable the cassette to be removed and replaced as in the first embodiment. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, out of the cassette 44 through an outlet O past the print zone 3 to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 7. The motor rotates to drive the image receiving tape through the print zone 3 continuously during printing. In either of the embodiments, it is possible that the tape be driven in a step wise manner by a stepper motor.

An image is printed on the tape fed out from the print zone to the cutting location C which is provided at a location in a portion of the wall of the cassette 44 which is close to the print zone 3. The portion of the wall on the cassette 44 where the cutting location C is defined is denoted by reference 52. A slot 54 is defined in the wall portion 52 and the image receiving tape 4 is fed past the print zone 3 to the cutting location C where it is supported by facing wall portions on either side of the slot 54.

The second tape printing device 1' includes a cutting mechanism 56 including a cutter support member 58 which carries a blade 60. The blade 60 cuts the image receiving tape 4 and then enters the slot 54. It should be appreciated that the first embodiment will usually also include a cutting mechanism.

Figure 5:
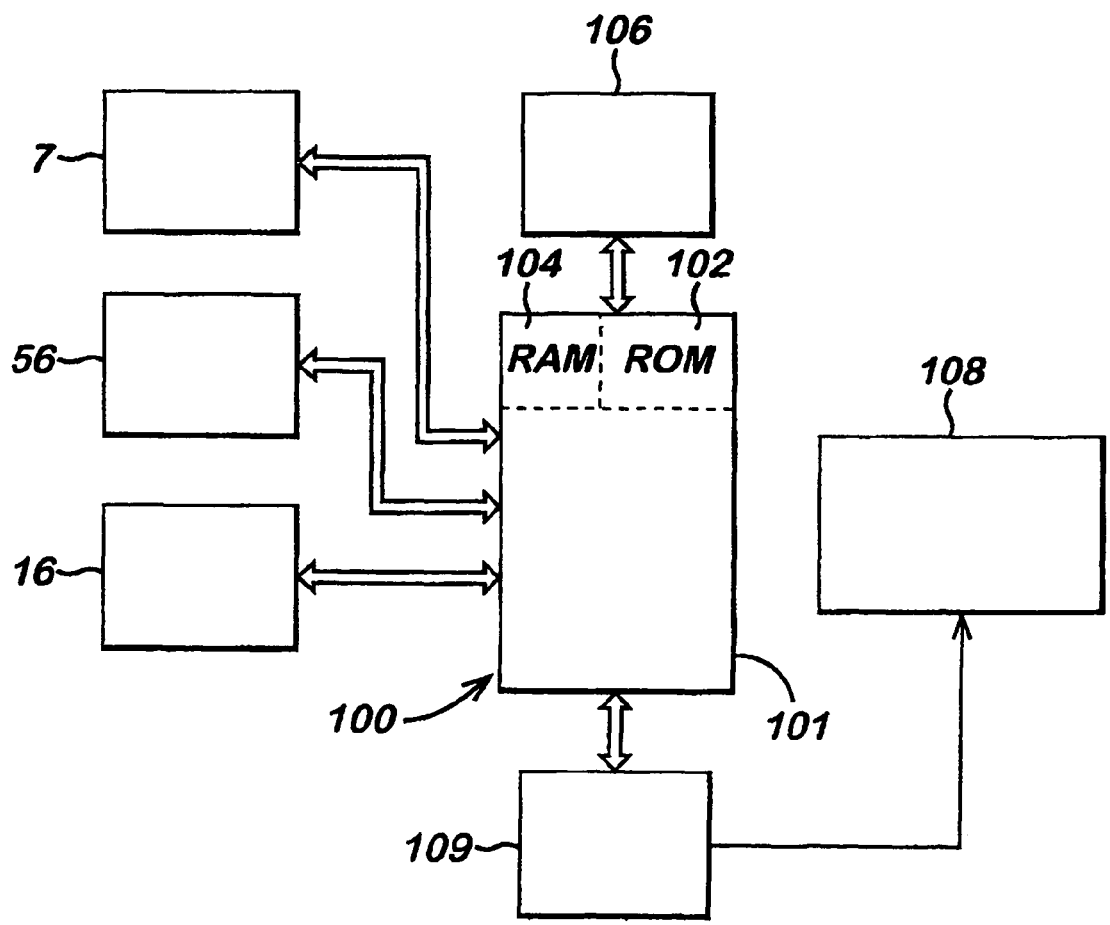
FIG. 5 is a diagrammatic sketch showing the control circuitry for the printing device of FIG. 2 or of FIG. 3.

Basic circuitry for controlling the tape printing device 1 of FIG. 2 or the tape printing device 1' of FIG. 3 is shown in FIG. 5. There is a microprocessor chip 100 having a read only memory (ROM) 102, a microprocessor 101 and random access memory capacity indicated diagrammatically by RAM 104. The microprocessor chip 100 is connected to receive label data input to it from a data input device such as keyboard 106. The microprocessor chip 100 outputs data to drive display 108 via a display driver chip 109 to display a label to be printed (or a part thereof) and/or a message for the user. The display driver alternatively may form part of the microprocessor chip. Additionally, the microprocessor chip 100 also outputs data to drive the print head 16 so that the label data is printed onto the image receiving tape to form a label. Finally, the microprocessor chip 100 also controls the motor 7 for driving the platen. The microprocessor chip 100 may also control the cutting mechanism 56 of FIG. 3 or a cutting mechanism of FIG. 2 to allow a length of tape to be cut off. In alternative embodiments at least part of the cutting mechanism may be manually operated.

The type of print head 16 with which embodiments of the present invention are concerned is shown in FIG. 4 and generally comprises a plurality of printing elements 120 which are selectively heated to allow thermal printing to take place. The thermal printing can be directly onto thermally sensitive image receiving tape 4 or can be by means of an ink ribbon 12 such as shown in the embodiments of FIGS. 2 and 3. As discussed in relation to these embodiments, the ink ribbon 12 is arranged between the print head 16 and the image receiving tape 4. The application of heat to the ink ribbon 12 by selected printing elements 120 of the print head 16 causes an image to be transferred to the image receiving tape. Each printing element 120 is generally square to print a square pixel on the image receiving tape. However, the printing elements may be rectangular or the like.

Each printing element 120 is a resistive element which, when current is passed therethrough is heated up. The printing elements 120 are selectively heated so as to allow an image to be printed on the image receiving tape 4 as it passes the print head 16. The image printed on the image receiving tape 4 is defined by a plurality of contiguous or adjacent columns of pixels. Thus the image printed on the image receiving tape 4 depends on which printing elements 120 are activated or heated and when. The image receiving tape 4 moves generally in the direction of arrow A, that is in the length wise direction of the image receiving tape 4 and perpendicular to the longitudinal axis L of the print head 16.

The schematic representation of the print head shown in FIG. 4 has twelve printing elements. In practice, the print head will have many more printing elements, for example 128. The print head 16 will generally have a height H slightly less than the width of the image receiving tape 4 to be used with the tape printing device 2. Where more than one width of tape is to be used with the tape printing device 2, the print head 16 will generally have a height H corresponding to the width of the largest image receiving tape 4 to be used with the tape printing device 12. Generally, the width W of the print head is equal to the width w of one printing element 120 to thereby form a column shaped print head 16.

Figure 6:
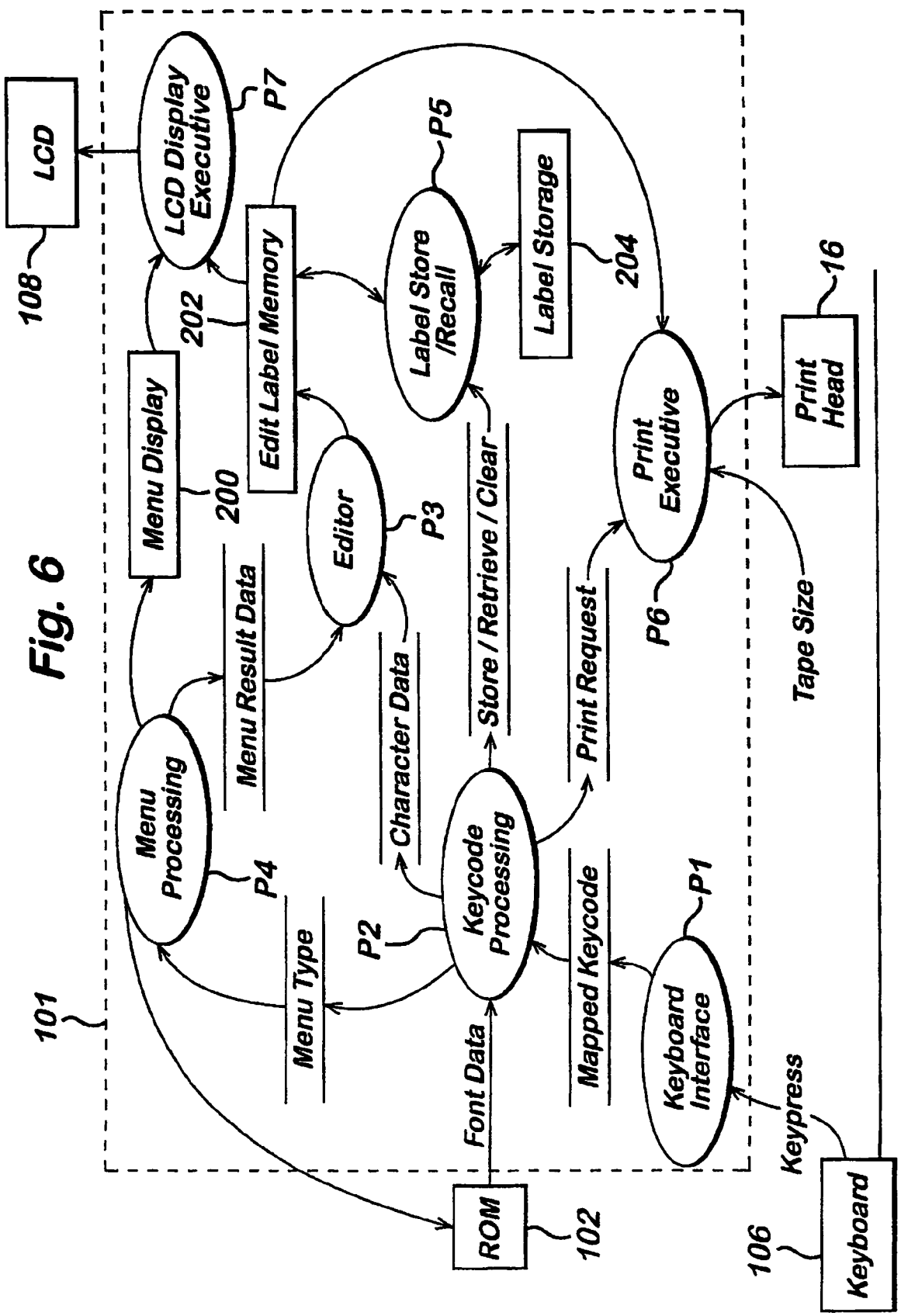
FIG. 6 is a diagram illustrating some of the control components of the printing device in greater detail.

FIG. 6 illustrates some of the control components of the printer as shown in FIG. 5. The sketched line 101 represents the print controller, and in this embodiment it is the microprocessor 101 which is depicted in FIG. 5, although it need not necessarily be a microprocessor. The circles within the controller 101 denote program components which are run within it to implement different control functions as described in the following. The controller 101 includes RAM 104. In practice, the RAM 104 may be implemented on the same chip as the processor, or be provided as a separate chip connected to the controller 101. The blocks labelled 200, 202, 204 represent portions of RAM 104. Block 200 is a menu display portion, block 202 is an edit label memory portion and block 204 is a label storage portion. In addition, the controller 101 contains or is associated with ROM 102 which holds font data for the characters. The structure of ROM 102 will be described more fully below. The controller 101 controls operations of the display 108 and supplies print data to the print head 16. It receives inputs from the ROM 102 and the keyboard 106.

The controller 101 runs a number of different programs to control operations of the printer. A keyboard interface program P1 receives key presses from the keyboard 106 and provides mapped key code data to a key code processing program P2. The key code processing program P2 has a number of different functions. Firstly, it receives the font data from ROM 102. It supplies menu-type data to a menu processing program P4 depending on the menu which is selected by the function keys 76 of the printer. It also supplies character data to an editor program P3 depending on the characters selected by the character selection keys 78 of the keyboard 106. It further supplies label store/recall functions to a label store/recall program P5. Finally, the key code processing program P2 supplies print request data to a print executive program P6.

The menu processing program P4 supplies menu result data to the editor program P3, and in certain circumstances is in communication with ROM 102, as will be discussed below with reference to language selection. It also supplies menu display data for storage in the RAM portion 200. The editor program P3 acts on the menu result data and character data to formulate and edit a label which is stored in a working portion of the RAM 104, the edit label memory portion, labelled 202 in FIG. 6. This working portion 202 of the RAM 104 holds data defining the current label which is being formulated and/or edited.

The label store/recall program P5 is operable responsive to store/recall functions supplied from the key code processing program P2 to transfer label data between the working portion 202 of the RAM 104 and a storage portion (label store/recall portion) 204 of the RAM 104.

The print executive program P6 receives tape size information (discussed later) in conjunction with print requests from the keyboard and controls operation of the print head 16 based on the label data which is held in the working portion 202 of the RAM.

Finally, the controller 101 runs an LCD display executive program P7 which manages data to be displayed on the display 108 based on the contents of the menu display portion 200 of the RAM and the working portion 202 of the RAM.

The printer can accommodate tapes having a plurality of different widths, in particular 6 mm, 9 mm, 12 mm, 19 mm and 24 mm. A switch allows a selection to be made between three settings, 6 mm; 9/12 mm; 19/24 mm. The manner in which this switch cooperates with the printer is described in our earlier European Patent EP634274 and therefore is not discussed further herein. In any event it will be appreciated that any manner of conveying tape size information to the print executive program P6 may be used.

Figure 7:
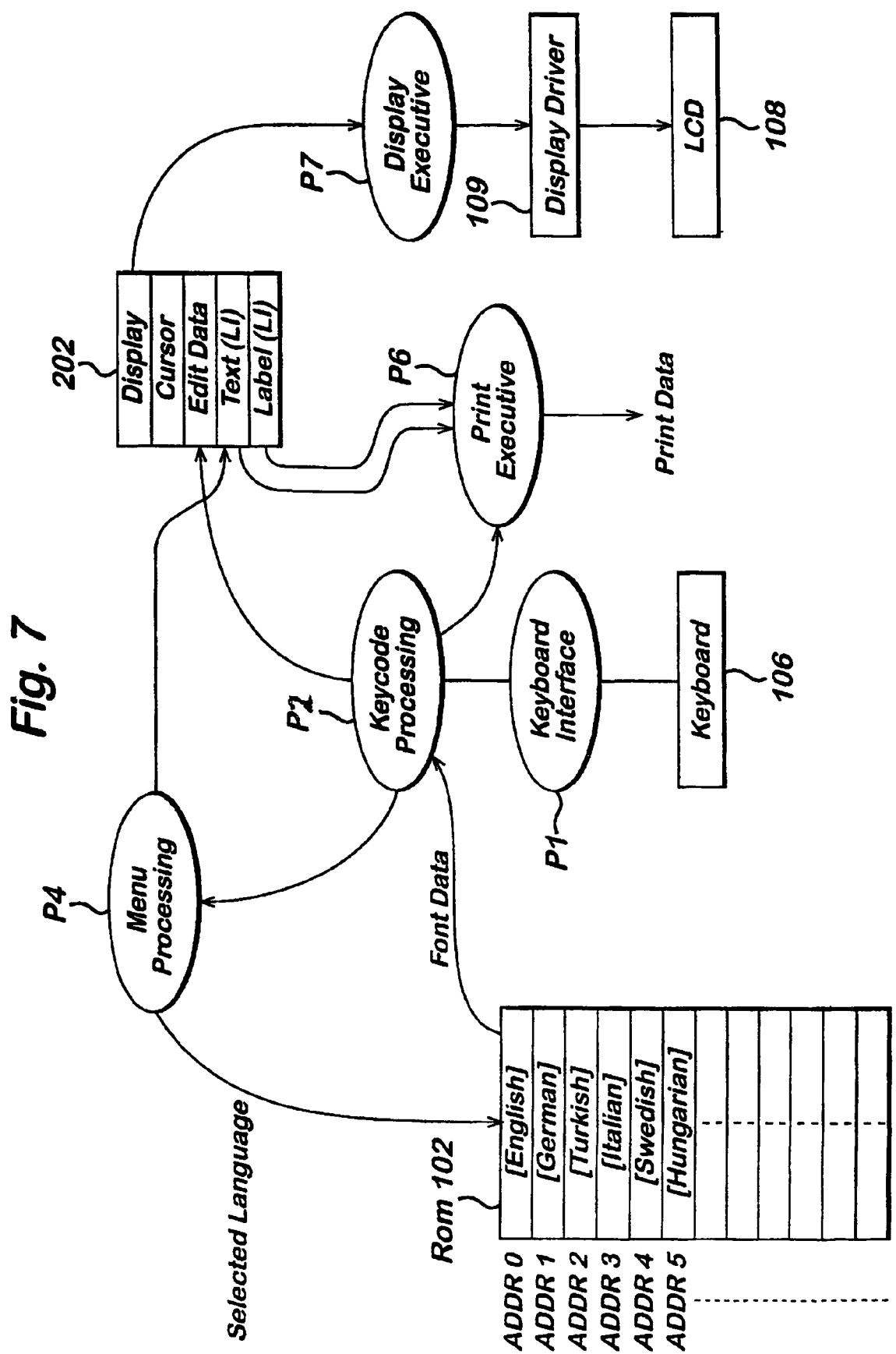
FIG. 7 shows some of the elements of FIG. 6 in more detail.

Label data is held in the working portion 202 of the RAM in different data structures as shown in FIG. 7. In particular, a text data structure label type (marked text in FIG. 7) holds text data regarding the characters and symbols etc. which have been selected for printing. The text data includes new page and new line information. An attribute data structure page setting type (marked label in FIG. 7) holds attributes with which the characters are to be printed, and effectively defines the format of the label. In addition, the working portion 202 of the RAM contains edit data including the position of a cursor as a file cursor type and display control information. At any time, label data and edit data for one label is held in the working portion 202 of the RAM.

The print executive program P6 generates print data for the print head as a sequence of columns of dot data based on the text data and attribute data. The edit data is not used for printing. The print executive program P6 does not formulate a complete dot pattern image of the label to be printed in RAM prior to printing. Instead, column data is prepared "on the fly". Thus, the print executive program P6 extracts text data from the text data structure and attribute data from the attribute data structure and manipulates this data to generate successive print columns. The print head 16 contains a buffer which holds one column of dot data, while the print head 16 itself prints a column of dot data at a time. Thus, while the print head 16 is printing one column, the next column can be placed in the buffer ready for printing. This technique is described in our earlier European Patent EP513290.

When a user is using the tape printing device to produce a label, the tape width must be selected from the choice described above. In this embodiment, the example of the creation of label L1 will be used. Once the selection of tape width has been made, there are also a number of possible character sizes which may be selected. The display shows the current character size. One of the function keys 76 can be pressed to select a size menu. The cursor keys 74 can then be used to scroll down the menu to select the required character size.

It is also possible for the user to select the length of label with which it is desired to print. In default mode (automatic length mode), there is no need to calculate this length, because it is dependent on the number of characters in the longest line of text of the label (in label L1 this would be "FILE 126") and the selected character size. This means that the label will be printed with the selected characters and character size using default character spacing, thus it is not a parameter which is actually controllable by the user. Alternatively, the user can select a fixed length with which the label is to be printed, in other words "fixed length mode" can be selected. These options are more fully described in the applicant's co-pending European Patent Application No. 01300555.8.

Once these choices have been made, the user can create label L1 by typing in the characters using the character keys 78. Since label L1 comprises uppercase letters, this can be achieved in one of two ways. Either the user can hold the shift key down whilst pressing the letter keys 78 for each letter or the caps lock function key can be pressed before the letter keys 78 are pressed. If the caps lock function key is pressed once, any letter keys 78 pressed afterwards results in production of uppercase letters on the display 108. The caps lock function key is a toggle switch, therefore if it is pressed a second time, any letter keys 78 pressed afterwards results in production of lowercase letters on the display 108. The numbers "126" are entered using the three number keys "1", "2" and "6". Another of the function keys 76, the return key, is used after the third "E" of "ESSELTE" to allow the two lines of text to be created. Keyboard interface program P1 receives the keyboard presses from keyboard 106 and provides mapped key code data to the key code processing program P2.

The key code processing program P2 supplies the character data to the editor program P3. The character size selection information is supplied from the menu processing program P4 to the editor program P3. The editor program P3 uses the character data and character size information to formulate the label. This formulated text data, including the return key information, is put into the text data structure label type in the working portion 202 of the RAM 104. Executive program P7 acts on the data in working portion 202 and drives display driver 109 to display the data on display 108.

In this embodiment the default language of the tape printer is English, although it would be possible to configure the printer to have a different default language. Thus if a user wishes to work in the English language, he or she can simply carry out the process described in the previous three paragraphs, to create many different labels. On the other hand, if the user wishes to work in a different language from English, the tape printer of the embodiment provides the necessary means for doing this, as will now be described.

Referring to FIGS. 1 and 7, there is provided within keyboard 106 as one of the function keys 76 a "language" key. If the user presses this key, a menu is displayed through which the user can scroll using cursor keys 74 in order to choose the language in which it is desired to work. It can be seen that when the keycode processing program P5 receives a signal from the keyboard interface program P1 that the language has been selected, it sends a signal to the menu processing program P4, which is then able to ascertain which language has been selected. Menu processing program P4 then sends a notification to ROM 102 in the form of a pointer to a particular address within ROM 102, the address being dependent on the language selected.

FIG. 7 shows diagrammatically some of the different addresses within ROM 102. In the embodiment, ADDR 0 is for the English language and the pointer will point to this address by default. Similarly, ADDR 1 is for the German language, ADDR 2 is for the Turkish language, ADDR 3 is for Italian and so on.

Each address of ROM 102 which specifies a language is associated with a table, also stored within ROM 102. These tables have stored all the possible text characters of the alphabet of their language, plus punctuation and number characters and any other codes or characters which are specific to that particular language. Font data is supplied to the keycode processing program P5 from the appropriate table in dependence on the language selected by the user. In practice, these tables would be stored as binary or ascii data, but tables 1 to 17 which show the characters as Latin letters and decimal numbers can be referred to for the purposes of understanding the structure of these tables.

Referring firstly to table 1, this is the table for the English language which is associated with ADDR 0 of ROM 102. It can be seen that in the first column, the first 26 rows contain the 26 letters of the alphabet as uppercase letters and the second 26 rows contain the 26 letters of the alphabet as lowercase letters. The subsequent columns in these 52 rows are empty, since the English language has no accented letters. The remainder of the table contains punctuation, numbers 0-9 and abbreviations for the months of the year. When a user presses a particular character key 78, the keycode processing program P2 accesses column 1 of the appropriate row of table 1 for the font data, so that character data can be generated. Whether the keycode processing program P2 accesses the uppercase or lowercase row for the particular character key pressed depends on whether the shift function key or the caps lock function key has been pressed to select uppercase.

Turning now to table 2, this is the table for the German language which is associated with ADDR 1 of ROM 102. The first column of this table is identical to that of table 1 for the English language. However, the second column contains some extra characters which are specific to German. These are Ä, Ö, Ü, ä, ö, β and ü. The Ä is stored in the same row as uppercase A, the Ö is stored in the same row as uppercase O and the β is stored in the same row as lowercase s, and so on.

If the user has selected German as the language to work in, as explained previously, the pointer from the menu processing program P4 will point to ADDR 1 ROM 102, which means that font data is obtained from table 2. If, for example, the user presses key "b", font data from the first column and 28$^{th}$ row will be obtained by the keycode processing program P2 and passed as character data to editor program P3, which allows the letter "b" to be stored in the working portion edit label memory 202 of RAM 104 as part of the label being currently edited by the user. Additionally, this data as it is stored in the display portion of edit label memory 202 is acted on by display executive program P7 so that the display driver 109 is driven to display the letter "b" on LCD display 108.

If the user presses the key "u" in the normal way, the same process occurs so that font data is obtained from the first column and 47$^{th}$ row so that the letter "u" is displayed on LCD display 108. However, the tape printer of the embodiment is configured to allow the user to select the "ü" by maintaining activation of the key "u" for a longer time period. After a first period, "u" is displayed on LCD display 108 but after a second period, font data from the second column and 47$^{th}$ row is accessed by key code processing program P2, so that the letter "ü" is displayed on LCD display 108 in place of the originally displayed "u".

Thus it can be understood that when a key is activated initially a particular letter accesses the appropriate row in the first column of table 1 and when the same key is maintained under activation, the letter accesses the same row but the second column. In order for this process to work, the user must maintain the key "u" pressed for a predetermined time. In this embodiment, this predetermined time is 1 s, but it could be set at a different time. Thus if the user presses the key "u" for 2 s, the initially displayed "u" will be overwritten on the display 108 and replaced with "ü". Thus the initial "u" is no longer part of the label being edited. The location within the edit label memory working portion 202 of RAM 104 and hence the location on display 108 in which a letter entered by the user will be added is dependent on the position of the cursor. The cursor is controlled by the keycode processing program P2 so that it moves to the correct position on the basis of key presses detected. In this embodiment it takes the form of a flashing underline underneath the letter, but it could take other forms.

The initial predetermined time T1 can be different than the following predetermined time T2, as shown in FIG. 9, where KP denotes the initial keypress and LR denotes commencement of repeat of the list If the user maintains the key "u" pressed for 3 s, the display will revert to a normal "u". In other words, repeated pressing of the key "u" toggles between "u" and "ü". The other letters provided with associated accented keys are operated in a similar way.

Thus it can be understood that an accented letter can be made part of the label under edit by using the same key and without the need for any extra keys to be provided on keyboard 106. It can also be appreciated that at an initial key press, the appropriate row of the table is accessed, but when the key press is maintained for a predetermined time period, access occurs in the same row but a different column.

Once a user has created on the display the label which it is desired to be printed, in order to print the label, a print key is pressed. As described above, the data of the label under edit as stored in edit label memory 202 is acted on by the print executive program P6 in order to produce data in a form suitable to be sent to the print head 16. Since printing is carried out on the data stored in edit label memory 202, any characters which were scrolled through by the user, e.g. an initial "u" which is subsequently overwritten by a "ü", will not form part of the data to be printed.

Turning now to table 3, this is the table for the Turkish language which is associated with ADDR 2 of ROM 102. It can be seen that this table also contains the same basic letters in uppercase and lowercase in the first 52 rows of column 1, as well as some accented letters in column 2 which are accented versions of the letters in the same row in column 1. These letters can be added to the label under edit in the same way as for the accented German letters.

Referring now to table 4, this is the table for the Italian language which is associated with ADDR 3 of ROM 102. It can be seen that this table also contains the same basic letters in uppercase and lowercase in the first 52 rows of column 1, as well as some accented letters in column 2 which are accented versions of the letters in the same row in column 1. However, this table further contains some different accented letters in column 3. These only occur in rows which have a first accented letter in column 2 because column 3 is used for the second differently-accented version of a particular letter. For example, in column 1, row 31 is stored a normal lowercase letter "e". In column 2, row 31 is stored an "è" and in column 3, row 31 is stored an "é". If the user wishes to add a normal "e" to the label under edit, the key "e" is just pressed once in the normal way. If it is desired to add an "è" to the label under edit, the key "e" is maintained pressed, in a similar way as described with respect to accented German letters. If it is desired to add an "é" to the label under edit, the key "e" is maintained pressed for a still further time period. This causes the third column of table 4 to be accessed by keycode processing program P2 so that the letter "é" replaces the letter "è" in edit label memory 102 and on LCD display 108. The time period for maintaining activation of a single key is the same as described with respect to German.

Again, continued activation of the "e" key toggles between the three versions of that letter, so that each time the cursor remains stationary and the previous version is overwritten in edit label memory 202 and on display 108.

Referring to table 5 for the Swedish language, table 6 for the Latvian language, table 7 for the Polish language, table 8 for the Lithuanian language, table 9 for the Czech language and table 11 for the Slovakian language, it can be seen that these tables differ in the particular letters which have equivalent accented letters, the type of accent and the number of accented versions of a particular letter. For example, Lithuanian requires a Ž in column 2 row 26, whereas, although Polish also requires accented versions of the letter Z, it requires two which are different from Ž (Ź and Ż). In other words, each table is tailored to the particular accented versions of any letters of the alphabet which require them, and column 3 is used if a particular letter requires more than one accented version of the same letter. Each table is tailored to a particular language and is accessed by a pointer to a particular address in ROM 102.

It should be particularly noted with reference to table 10, for the Norwegian language that a diphthong letter is provided. This means that if the user wishes to add "æ" to the label under edit, this can be achieved by maintaining the key "a" pressed for an extended period.

Turning now to table 12 for the Hungarian language, table 13 for the Finnish language and table 14 for the French language, it can be seen that these languages require more than two accented versions of some letters. For example, with reference to table 12, Hungarian requires a normal letter "u" plus "ú", "ü" and "ü". Thus in column 1 row 41 is stored a normal "u" as for other languages, in column 2 row 41 is stored a "ú", in column 3 row 47 is stored a "ü" and in column 4 row 47 is stored a "ü". This means that the length of time it is necessary to maintain activation of the key to add a particular version of the letter "u" to the label under edit depends on its storage column. Thus four seconds are required for the "ü".

It should also be noted with reference to table 14 that the French language also requires three different accented versions of the letter "u". In this case, however, they are different from those of the Hungarian language: "ú", "û" and "ü". Thus the tables have the flexibility to allow only the particular accented versions of a letter required by a particular country to be available.

In table 13 for the Finnish language, it should be noted that the letter "e" is set up to allow the word "euro" to appear in the label under edit if the key "e" is maintained pressed for 2 s. This feature could be added to any of the tables should this be considered desirable. Alternatively, the euro symbol could be available. Other words could be produced in the same way.

In this description, the phrase "accented character" includes diphthongs and any words such as "euro".

Table 15 shows the characters available for the Spanish and Portuguese languages. Thus it can be appreciated that should any two languages require exactly the same set of letters, memory space can be saved by only storing one table for use when working in both languages. This table could be accessible by two pointers from the menu processing program P4 in dependence on whether the user selects Spanish or Portuguese. Alternatively, the language menu could only have a single choice for "Spanish/Portuguese". It may be advantageous to have a separate choice if other functions, for example spell checking, depend on the language being used.

Finally, it can be seen from tables 16 and 17 that Dutch and Danish require the largest numbers of accented characters of all the languages shown in tables 1 to 17. For example, the letter "o" in Dutch requires 6 accented characters and these are stored in columns 2 to 7 of row 15 of table 16. In order to access the diphthong "œ" , the key of the letter "o" has to be pressed for 7 s. This is nevertheless a relatively quick process and does not require any complicated key sequences.

It should also be noted, with reference to the letter "a" that in both Dutch and Danish, six accented versions are required. In Dutch they are "ä", "à", "ä", "á", "ã" and "æ". In Danish they are "à", "á", "â", "ä", "a" and "ã". Although some of these letters are common to both languages, they are placed in a different order along the columns. This highlights another important feature of the embodiment which is that all accented characters of each language are stored in the order in which they are most commonly used in that language. This means that the more common the character, the shorter time needed to access it.

Regardless of the period required to select a particular character or the number of times the user toggles through the selection of characters for a particular letter, the final one selected will be stored in edit label memory 202, so it is only this finally selected character which the print executive program P6 acts on when the user chooses to print, rather than all intermediate characters.

By virtue of the ability to store and select from a number of tables of characters in respect of a number of different languages, the described embodiment allows the same machine with the same microprocessor and associated memory chips to be supplied to users in different countries. Furthermore, if any given user wishes to write in a different language other than his or her own, it is easy to access all the letters required for the different language, simply by selecting it from the language menu. Alternatively, the pointer controlled by menu processing program P4 could be frozen on a particular language for machines to be sold in a particular country, should this be required. The arrangement also allows a standard keyboard having only the 26 letters of the alphabet for character keys to be used for machines intended for sale and use in a large number of countries.

Furthermore, the provision of a shift function key and a caps lock function key allows a label to be displayed and printed using either uppercase or lowercase letters or a mixture of both, by provision of only one or two extra keys. It is not absolutely necessary to provide a shift function key for the production of uppercase letters because this could be achieved solely by use of the caps lock function key. However a shift key may be desirable if it is intended to use any of the keys, for example the number keys, to double as, for example, punctuation keys.

The invention is not limited to the particular selection of languages discussed above. It would be equally possible to provide tables containing the accented versions of letters for other languages. For example, it is not necessary to store Roman letters in column 1. Instead they could be replaced by those of a different alphabet, for example the Russian alphabet to allow users to work in Russian.

Figure 10:
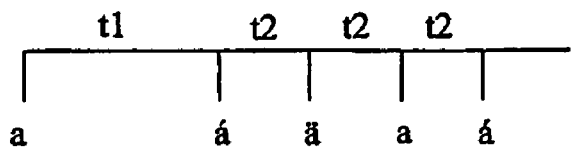
FIG. 10 is another example of a timing diagram for keypresses.

Referring to FIG. 10, a character selection key has a principle character, in this case the character "a", and associated additional characters, "á" and "ä". When the character selection key is actuated and released within the predetermined time t1, the principle character is selected. The character is automatically confirmed and the cursor is moved to the next position.

Additional characters associated with the principle character may be accessed by a user, by keeping the character selection key pressed for the predetermined time t1. After actuating the character selection key, the edit display 108 displays the principle character, "a", at the position of the cursor for the predetermined time t1. After the predetermined time t1 has elapsed, the principle character is replaced by the first additional character, "á", in the list of additional characters associated with the principle character.

When the character selection key remains pressed, the edit display 108 displays the second additional character, "ä", after a predetermined time t2 has elapsed. This continues for as long as the character selection key is pressed. When the last additional character in the list of additional characters associated with the principle character is reached, the last additional character is replaced by the principle character after the predetermined time t2. If the character selection key is pressed for another predetermined time t2, then the principle character is again replaced by the first additional character.

When the character selection key is released, the additional character which is displayed at the moment of release is selected. The character is automatically confirmed and the cursor is moved to the next position.

Figure 11:
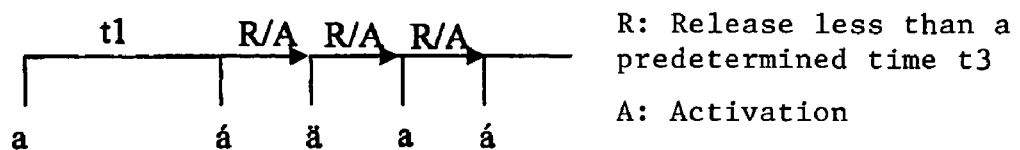
FIG. 11 is a further example of timing diagram for keypresses.

Referring to FIG. 11, the function of a character selection key may be switched between a first mode of operation in which the key may be used to select a principle character only and a second mode of operation in which the key may be used to select the principle character and additional characters associated with the principle character.

When a character selection key, which has a principle character and associated additional characters, is actuated, the principle character is selected when the character selection key is released within the predetermined time t1. In this case, the character is automatically confirmed and the cursor is moved to the next position.

Additional characters associated with the principle character may be accessed by a user, by keeping the character selection key pressed for the predetermined time t1. After the character selection key is pressed, the edit display 108 displays the principle character at the position of the cursor for the predetermined time t1. When the predetermined time t1 has elapsed, the principle character is replaced by the first additional character from the list of additional characters associated with the principle character. At this time, the function of the character selection key is switched to the second mode of operation in which the key may be used to select the principle character and additional characters associated with the principle character.

When the key is released and actuated again, the first additional character is replaced by the second additional character. When the key is released and actuated again, the second additional character is replaced by the third additional character, and this continues until the last additional character is reached. A subsequent actuation of the character selection key replaces the last additional character with the principle character and another actuation replaces the principle character with the first additional character again.

When the character selection key is released for a predetermined time t3, the displayed character is selected and the cursor moves to the next position. At this time, the function of the character selection key automatically resets to the first mode of operation for selecting principle characters only.

Alternatively, the predetermined time t3 starts at the moment of actuation of the character selection key, i.e. at the moment the displayed character changes from the one character to the other. If after the predetermined time t3 no subsequent actuation of the character selection key is done, the displayed character is selected and the cursor moves to the next position.

Figure 12:
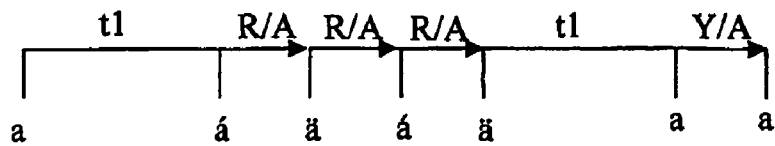
FIG. 12 is yet another example of a timing diagram for keypresses.

Referring to FIG. 12, the function of the character selection key may be switched between a first mode of operation in which only principle characters may be selected and a second mode of operation in which only additional characters may be selected.

In one alternative embodiment, keeping the character selection key actuated for a predetermined time t1, for example 1 second, switches the function of the key from selection of the principle character only to selection of principle and additional characters.

When a character selection key, which has a principle character and associated additional characters, is actuated, the actuation of the character selection key selects the principle character, if the actuation is released within the predetermined time t1. The character is automatically confirmed and the cursor is moved to the next position.

The user can access additional characters, associated with the principle character, by keeping the character selection key actuated for the predetermined time t1. After actuating the character selection key, the edit display displays at the position of the cursor the principle character for the predetermined time t1 and after the predetermined time t1 this principle character is replaced by the first additional character in the list of additional characters associated with the principle character.

The user can continue by keeping the key actuated to scroll through the different characters or the user can scroll through the different characters by successive actuation of the character selection key.

In the case of keeping the key actuated, when after the predetermined time t1 (1 second in the present embodiment) of actuation the first additional character is displayed, keeping the character selection key activated for a predetermined time t2, for example also 1 second, will replace the displayed character by the second additional character, third additional character, . . . , last additional character, principle character, first additional character and so on. In one modification, the principle character may not be available and so after the last additional character, the first additional character is displayed.

Releasing the character selection key for more than a predetermined time t4, for example one second, selects the displayed character and the cursor is moved to the next position. The function of the character selection key is automatically reset to character selection only.

In the case of successive actuation, when after predetermined time t1 (for example 1 second) of actuation the first additional character is displayed, successive actuation of the character selection key will replace the displayed character by the second additional character, third additional character, . . . , last additional character, principle character, first additional character and so on. In one modification, the principle character may not be available and so after the last additional character, the first additional character is displayed.

Releasing the character selection key for more than the predetermined time t3, one second in the present embodiment, selects the displayed character and the cursor is moved to the next position. The function of the character selection key is automatically reset to character selection only.

Alternatively, the time may be measured from the moment the displayed character changes. If, from the moment of the character changes, for a predetermined time t5, for example 1 second, the character selection key is released, which could be after a period of holding the key actuated or after successive actuations, and is not actuated subsequently, the displayed character is selected and the cursor is moved to the next position. The function of the character selection key is automatically reset to character selection only.

Figure 13:
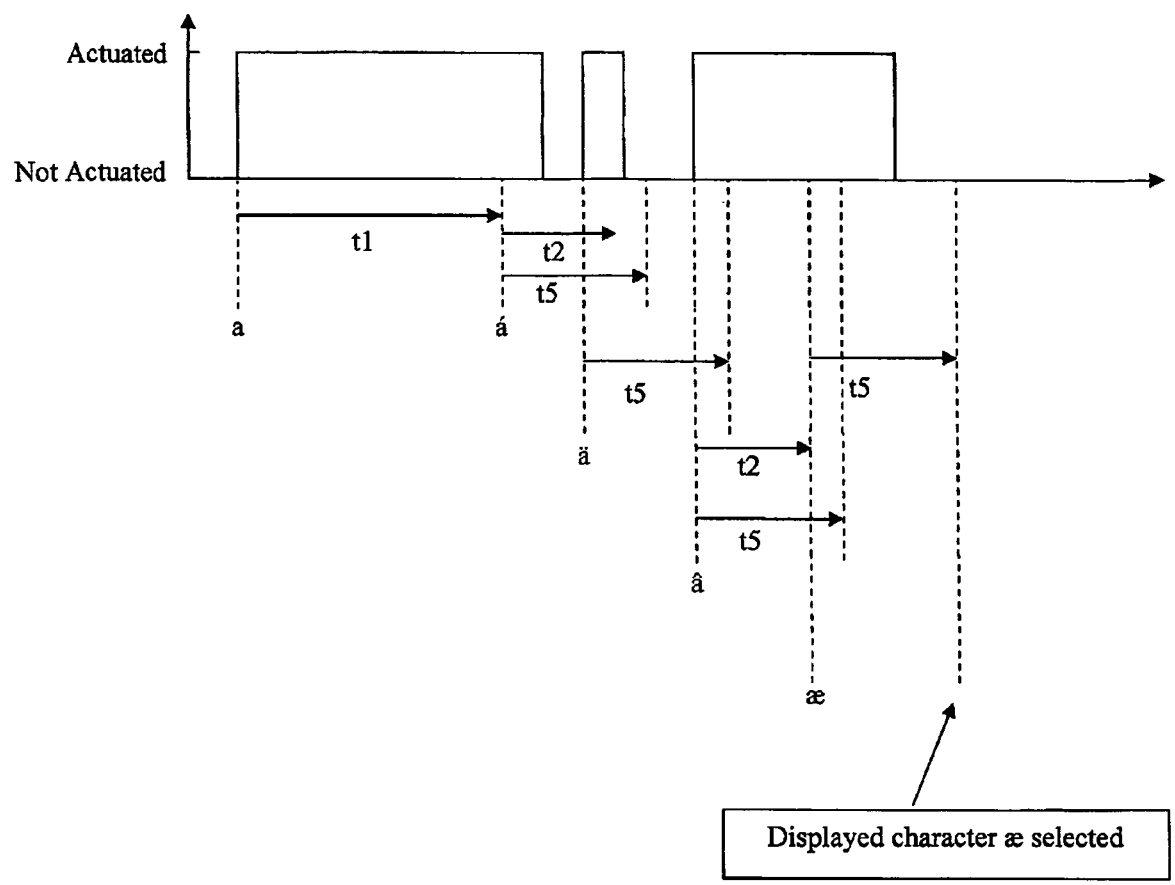
FIG. 13 is still another example of a timing diagram for keypresses.

It is mentioned that keeping the character selection key actuated to switch between displayed characters and successive actuations to switch between displayed characters can be used in the same embodiment. Referring to FIG. 13, the user may switch to the function for the selection of principle and additional characters by keeping the character selection key actuated for a predetermined time t1. Accordingly, the display switches from, for example, a to á. Releasing the character selection key before the predetermined time t2 has elapsed and subsequent actuation of the character selection key before the predetermined time t5 has elapsed, changes the displayed character, the display changes for example from á to ä. Releasing the character selection key again before the predetermined time t2 and subsequent activation before the predetermined time t5 changes the displayed character to the next additional character, and the display switches from, for example, ä to â. If the character selection key now remains actuated for the predetermined time t2, the displayed character changes and the display changes from, for example, â to æ. When the character selection key is released before the predetermined time t2 has elapsed and is not actuated again, the displayed character is selected after the predetermined time t5, where the predetermined time t5 is measured from the moment the character changes on the display. The cursor is then moved to the next position.

Releasing the character selection key and actuating any other key than the current character selection key, selects the displayed character and moves the cursor to the next position. The function of the other actuated key may or may not be activated.

In one preferred embodiment, using a display with at least two lines, this feature can be more user friendly. On the display, a number of characters from the set of principle character and additional characters can be displayed. This can for example be done on a second line or bottom line of a display. Alternatively it can be done on the top or first line of a display. Alternatively, this can be done in a separate part of the display or on a separate display. The displayed character at the position of the cursor in the display can be marked in the row of characters and the user sees what the next character will be if he keeps the character selection key activated or if he does another activation when the function of the key is switched to activation of additional characters. The display could be arranged to show all the characters associated with a given key on the display. The cursor can move through the options as the associated key is pressed. The display may alternatively only show the current option and the next available option or a subset of all of the available options associated with a given key.

A front view of a third type of printer is depicted in FIG. 8, labelled generally with reference numeral 1". This printer differs from printers 1, 1' in that it has a different keyboard 106' and a different display 108'. It can be used with either the two cassette system of FIG. 2 or the one cassette system of FIG. 3 and can be controlled in a similar way.

In a different embodiment, the keyboard 106' and display 108' of this printer, or indeed the keyboard 106 and display 108 described previously, could be used in an ink jet system. An ink jet printer and control thereof is described in the applicant's granted patent EP 0564297. It is possible to use an ink jet printer without an image receiving tape being present in the printer, but rather to use it as a stamper. In this case, instead of using the edit label memory 202, data to be printed would be sent directly to a print buffer.

Keyboard 106' differs from keyboard 106 in that it does not have numerous character keys 78 but instead has a reverse scroll key 80, a forward scroll key 82 and an Enter key 84. The keys 80, 82 are used to scroll through the alphabet.

Display 108' differs from display 108 in that it is merely a five-character display and it does not use a flashing underline as a cursor. Features of display 108' will be discussed in the following.

When the machine 1" is switched on it will display the letter "a" in the first character space, as a default. Alternatively it could display the last letter that was selected by the user before the printer was switched off previously, or some other letter as a default. If the forward scroll key 82 is then pressed, the display in the first character space changes to the letter "b". If it is maintained pressed, it changes to the letter "c" and so on, so that with each time period, the display changes to the next letter in the alphabet. Similarly, if the reverse scroll key 80 is pressed, the display changes to the previous letter in the alphabet. Thus the user can scroll through the entire alphabet using only the two keys 80, 82.

It would be possible to provide a display having a different number of character spaces or to display more than one letter under selection at a time and allow the user to know which letter they have scrolled to by a different means, for example a cursor.

If it is desired to select a letter to form part of a label under edit or a word to be ink jet stamped, the scroll keys 80, 82 are maintained pressed until the desired letter is visible on the display 108'. At this point the Enter key 84 is pressed. This causes the letter to flash. If the user wants to add this letter to the label or word, the enter key 84 is pressed again, in which case character data for this letter is stored in edit label memory 202, from where it can be displayed or printed, or alternatively sent directly to a print buffer. The letter "a" then appears in the second character space on the display 108', and cursor keys 80, 82 can then be used to change this second letter.

Thus each time a letter is actually selected by the user (as opposed to merely being visible as it is scrolled to), the selected letter is stored in memory or a print buffer and the letter "a" appears in the next character space and can be edited. It would be possible to have a different letter or symbol etc. appear. If a word of more than five letters is written, the start of the word moves out of view, but is nevertheless printed if the user chooses to print. It would be possible to only require one press of the Enter key 84 to select a letter.

The above-described procedure is suitable if the user is working in the English language. However, if it is desired to work in a different language, this can be selected using scroll keys 80, 82. When the printer 1" is switched on, these keys can be used to scroll through a number of different menus. One of these menus is a language menu and in order to select the language in which the user wishes to work, the Enter key 84 is pressed in order to take the user into this language menu. The scroll keys 80, 82 can then be used to scroll through a number of available languages, and the desired language can then be selected with Enter key 84. A pointer from the menu processing program P4 points to the appropriate table stored in ROM 102 as previously described.

When working in a language other than English, the user is able to scroll through the letters of the alphabet using scroll keys 80, 82, in the same way as described above with respect to English. This process is in fact a scroll up or down column 1 of the table for the language chosen. At the first press of the Enter key 84, the display is set at the letter which has been scrolled to. At this point, the user can either press Enter key 84 to select the basic letter, or scroll keys 80, 82 can be kept pressed to scroll through further columns of the table along the same row. For example, if the user is working in Danish, font data from table 17 will be used. If the user selects the letter "a" with scroll keys 80, 82, he or she will be at column 1 row 27 of table 17. If the Enter key 84 is then pressed once, scroll keys 80, 82 can subsequently be used to scroll along row 27 through the accented characters "à", "á", "â", "ä", "a" and "ã". If forward cursor key 80 is pressed, the cursor will move to these letters in the order in which they appear in the table. If reverse cursor key 82 is pressed, the cursor will move along them in the opposite order. This system allows the selection time to be minimised for the required character, for example it would be more efficient to use reverse scroll key 80 rather than forward scroll key 82 if, for example the character "ã" is required. As the user scrolls through the accented characters, they appear on the display in turn in place of the basic letter "a". When the display shows the character which is to be added to the label, the Enter key 84 is pressed again and this adds that character to the label under edit such that it is stored in edit label memory 202, or alternatively that character is sent directly to a print buffer.

As described before, once characters have actually been selected in the manner described, if the user wishes to print the label or word, only those characters which have been positively selected by two presses of the Enter key 84 will actually be printed.

Embodiments of the invention have made reference to keys. It should be appreciated that this term is intended to include touch screen or touch sensitive implementations providing equivalent functions.

Various embodiments of the invention have given examples of times. These are all by way of example and it will be clear to the man skilled in the art that alternative timings may be used.

All patents and/or patent applications mentioned above are hereby incorporated into the present application in their entirety for all purposes.

The above-mentioned tables 1-17 now follow on pages 34-58.

TABLE 1

Country UK   Language English

| Example A | Additional local language characters in order of priority | | | |
|---|---|---|---|---|
| | À | Á | Â | Ä |
| A | | | | |
| B | | | | |
| C | | | | |
| D | | | | |
| E | | | | |
| F | | | | |
| G | | | | |
| H | | | | |
| I | | | | |
| J | | | | |
| K | | | | |
| L | | | | |
| M | | | | |
| N | | | | |
| O | | | | |
| P | | | | |
| Q | | | | |
| R | | | | |
| S | | | | |
| T | | | | |
| U | | | | |
| V | | | | |
| W | | | | |
| X | | | | |
| Y | | | | |
| Z | | | | |
| a | | | | |
| b | | | | |
| c | | | | |
| d | | | | |
| e | | | | |
| f | | | | |
| g | | | | |
| h | | | | |
| i | | | | |
| J | | | | |
| k | | | | |
| l | | | | |
| m | | | | |
| n | | | | |
| o | | | | |
| p | | | | |
| q | | | | |
| r | | | | |
| s | | | | |
| t | | | | |
| u | | | | |
| v | | | | |
| w | | | | |
| x | | | | |
| y | | | | |
| z | | | | |
| Punctuation | ? | . | : | ; | < | > | ! |
| 0-9 | | | | |
| Symbols | | | | |

TABLE 2

Country Germany   Language German

| Example A | Additional local language characters in order of priority | | | |
|---|---|---|---|---|
| | À | Á | Â | Ä |
| A | | | | Ä |
| B | | | | |
| C | | | | |
| D | | | | |
| E | | | | |
| F | | | | |
| G | | | | |
| H | | | | |
| I | | | | |
| J | | | | |
| K | | | | |
| L | | | | |
| M | | | | |
| N | | | | |
| O | Ö | | | |
| P | | | | |
| Q | | | | |
| R | | | | |
| S | | | | |
| T | | | | |
| U | Ü | | | |
| V | | | | |
| W | | | | |
| X | | | | |
| Y | | | | |
| Z | | | | |
| a | | | | ä |
| b | | | | |
| c | | | | |
| d | | | | |
| e | | | | |
| f | | | | |
| g | | | | |
| h | | | | |
| i | | | | |
| j | | | | |
| k | | | | |
| l | | | | |
| m | | | | |
| n | | | | |
| o | ö | | | |
| p | | | | |
| q | | | | |
| r | | | | |
| s | ß | | | |
| t | | | | |
| u | ü | | | |
| v | | | | |
| w | | | | |
| x | | | | |
| y | | | | |
| z | | | | |
| Punctuation | ? | . | : | ; | " | < | >> | ! |
| 0-9 | | | | |
| Symbols | | | | |

TABLE 3

| | Country Turkey Language Turkish | | | |
|---|---|---|---|---|
| | Additional local language characters in order of priority | | | |
| Example A | À | Á | Â | Ä |
| A | | | | |
| B | | | | |
| C | ç | | | |
| D | | | | |
| E | | | | |
| F | | | | |
| G | Ğ | | | |
| H | | | | |
| I | İ | | | |
| J | | | | |
| K | | | | |
| L | | | | |
| M | | | | |
| N | | | | |
| O | Ö | | | |
| P | | | | |
| Q | | | | |
| R | | | | |
| S | Ş | | | |
| T | | | | |
| U | Ü | | | |
| V | | | | |
| W | | | | |
| X | | | | |
| Y | | | | |
| Z | | | | |
| a | | | | |
| b | | | | |
| c | ç | | | |
| d | | | | |
| e | | | | |
| f | | | | |
| g | ğ | | | |
| h | | | | |
| i | ı | | | |
| j | | | | |
| k | | | | |
| l | | | | |
| m | | | | |
| n | | | | |
| o | ö | | | |
| p | | | | |
| q | | | | |
| r | | | | |
| s | ş | | | |
| t | | | | |
| u | ü | | | |
| v | | | | |
| w | | | | |
| x | | | | |
| y | | | | |
| z | | | | |
| Punctuation | ? | . | : | ; | < | > | ! |
| 0-9 | | | | |
| Symbols | | | | |

TABLE 4

| | Country Italy Language Italian | | | |
|---|---|---|---|---|
| | Additional local language characters in order of priority | | | |
| Example A | À | Á | Â | Ä |
| A | À | Á | | |
| B | | | | |
| C | | | | |
| D | | | | |
| E | È | É | | |
| F | | | | |
| G | | | | |
| H | | | | |
| I | Ì | | | |
| J | | | | |
| K | | | | |
| L | | | | |
| M | | | | |
| N | | | | |
| O | Ò | | | |
| P | | | | |
| Q | | | | |
| R | | | | |
| S | | | | |
| T | | | | |
| U | Ù | | | |
| V | | | | |
| W | | | | |
| X | | | | |
| Y | | | | |
| Z | | | | |
| a | à | | | |
| b | | | | |
| c | | | | |
| d | | | | |
| e | è | é | | |
| f | | | | |
| g | | | | |
| h | | | | |
| i | ì | | | |
| j | | | | |
| k | | | | |
| l | | | | |
| m | | | | |
| n | | | | |
| o | ò | | | |
| p | | | | |
| q | | | | |
| r | | | | |
| s | | | | |
| t | | | | |
| u | ù | | | |
| v | | | | |
| w | | | | |
| x | | | | |
| y | | | | |
| z | | | | |
| Punctuation | ? | . | : | ; | , | < | – | + | " | ' |
| | ( | ) | > | ! | | | | | | |
| 0-9 | 0 | 1 | 2 | 3 | 4 | 5 | 6 | 7 | 8 | 9 |
| Symbols | * | / | # | $ | £ | % | & | \ | = | ∈ |

TABLE 5

| | Country Sweden | Language Swedish | | |
|---|---|---|---|---|
| | \multicolumn{4}{c}{Additional local language characters in order priority} |
| Example A | À | Á | Â | Ä |
| A | Á | Â | | |
| B | | | | |
| C | | | | |
| D | | | | |
| E | | | | |
| F | | | | |
| G | | | | |
| H | | | | |
| I | | | | |
| J | | | | |
| K | | | | |
| L | | | | |
| M | | | | |
| N | | | | |
| O | Ö | | | |
| P | | | | |
| Q | | | | |
| R | | | | |
| S | | | | |
| T | | | | |
| U | | | | |
| V | | | | |
| W | | | | |
| X | | | | |
| Y | | | | |
| Z | | | | |
| a | ȧ | ä | | |
| b | | | | |
| c | | | | |
| d | | | | |
| e | | | | |
| f | | | | |
| g | | | | |
| h | | | | |
| i | | | | |
| j | | | | |
| k | | | | |
| l | | | | |
| m | | | | |
| n | | | | |
| o | ö | | | |
| p | | | | |
| q | | | | |
| r | | | | |
| s | | | | |
| t | | | | |
| u | | | | |
| v | | | | |
| w | | | | |
| x | | | | |
| y | | | | |
| z | | | | |
| Punctuation 0-9 Symbols | ? | . : ; | < > | ! |

TABLE 6

| | Country Lativa | Language Latvian | | |
|---|---|---|---|---|
| | \multicolumn{4}{c}{Additional local language characters in order of priority} |
| Example A | À | Á | Â | Ä |
| A | Ä | | | |
| B | | | | |
| C | | | | |
| D | | | | |
| E | Ë | | | |
| F | | | | |
| G | Ģ | | | |
| H | | | | |
| I | Ï | | | |
| J | | | | |
| K | Ķ | | | |
| L | Ļ | | | |
| M | | | | |
| N | Ņ | | | |
| O | | | | |
| P | | | | |
| Q | | | | |
| R | | | | |
| S | | | | |
| T | | | | |
| U | Ü | Ü | | |
| V | | | | |
| W | | | | |
| X | | | | |
| Y | | | | |
| Z | | | | |
| a | ä | | | |
| b | | | | |
| c | | | | |
| d | | | | |
| e | ë | | | |
| f | | | | |
| g | ġ | | | |
| h | | | | |
| i | ï | | | |
| j | | | | |
| k | ķ | | | |
| l | ļ | | | |
| m | | | | |
| n | ņ | | | |
| o | | | | |
| p | | | | |
| q | | | | |
| r | | | | |
| s | | | | |
| t | | | | |
| u | ü | ü | | |
| v | | | | |
| w | | | | |
| x | | | | |
| y | | | | |
| z | | | | |
| Punctuation 0-9 Symbols | ? | . : ; | < > | ! |

TABLE 7

Country Poland   Language Polish

Additional local language characters in order of priority

| Example A | À | Á | Â | Ä |
|---|---|---|---|---|
| A | Ą | | | |
| B | | | | |
| C | Ċ | | | |
| D | | | | |
| E | Ę | | | |
| F | | | | |
| G | | | | |
| H | | | | |
| I | | | | |
| J | | | | |
| K | | | | |
| L | Ł | | | |
| M | | | | |
| N | Ń | | | |
| O | Ó | | | |
| P | | | | |
| Q | | | | |
| R | | | | |
| S | Ś | | | |
| T | | | | |
| U | | | | |
| V | | | | |
| W | | | | |
| X | | | | |
| Y | | | | |
| Z | Ż | Ź | | |
| a | ą | | | |
| b | | | | |
| c | ć | | | |
| d | | | | |
| e | ę | | | |
| f | | | | |
| g | | | | |
| h | | | | |
| i | | | | |
| j | | | | |
| k | | | | |
| l | ł | | | |
| m | | | | |
| n | ń | | | |
| o | ó | | | |
| p | | | | |
| q | | | | |
| r | | | | |
| s | ś | | | |
| t | | | | |
| u | | | | |
| v | | | | |
| w | | | | |
| x | | | | |
| y | | | | |
| z | ż | ź | | |

TABLE 8

Country Lithuania   Language Lithuanian

Additional local language characters in order of priority

| Example A | À | Á | Â | Ä |
|---|---|---|---|---|
| A | Ą | | | |
| B | | | | |
| C | Č | | | |
| D | | | | |
| E | Ė | Ę | | |

TABLE 8-continued

Country Lithuania   Language Lithuanian

Additional local language characters in order of priority

| Example A | À | Á | Â | Ä |
|---|---|---|---|---|
| F | | | | |
| G | | | | |
| H | | | | |
| I | Į | | | |
| J | | | | |
| K | | | | |
| L | | | | |
| M | | | | |
| N | | | | |
| O | | | | |
| P | | | | |
| Q | | | | |
| R | | | | |
| S | Š | | | |
| T | | | | |
| U | Ų | Ū | | |
| V | | | | |
| W | | | | |
| X | | | | |
| Y | | | | |
| Z | Ž | | | |
| a | ą | | | |
| b | | | | |
| c | č | | | |
| d | | | | |
| e | ę | ė | | |
| f | | | | |
| g | | | | |
| h | | | | |
| i | į | | | |
| j | | | | |
| k | | | | |
| l | | | | |
| m | | | | |
| n | | | | |
| o | | | | |
| p | | | | |
| q | | | | |
| r | | | | |
| s | š | | | |
| t | | | | |
| u | ų | ū | | |
| v | | | | |
| w | | | | |
| x | | | | |
| y | | | | |
| z | ž | | | |
| Punctuation 0-9 Symbols | ? | . | : ; | < > ! |

TABLE 9

Country: Czech Republic   Language: Czech

Additional local language characters in order of priority

| Example A | À | Á | Â | Ä |
|---|---|---|---|---|
| A | Á | | | |
| B | | | | |
| C | Č | | | |
| D | Ď | | | |
| E | Ě | É | | |
| F | | | | |
| G | | | | |

TABLE 9-continued

Country: Czech Republic  Language: Czech

Additional local language characters in order of priority

| Example A | À | Á | Â | Ä |
|---|---|---|---|---|
| H | | | | |
| I | İ | | | |
| J | | | | |
| K | | | | |
| L | | | | |
| M | | | | |
| N | Ṅ | | | |
| O | Ȯ | | | |
| P | | | | |
| Q | | | | |
| R | Ṙ | | | |
| S | Ṡ | | | |
| T | Ṫ | | | |
| U | U̇ | Ü | | |
| V | | | | |
| W | | | | |
| X | | | | |
| Y | Ẏ | | | |
| Z | Ż | | | |
| a | ȧ | | | |
| b | | | | |
| c | ċ | | | |
| d | ḋ | ë | | |
| e | ė | | | |
| f | | | | |
| g | | | | |
| h | | | | |
| i | i̇ | | | |
| j | | | | |
| k | | | | |
| l | | | | |
| m | | | | |
| n | ṅ | | | |
| o | ȯ | | | |
| p | | | | |
| q | | | | |
| r | ṙ | | | |
| s | ṡ | | | |
| t | ṫ | | | |
| u | u̇ | ü | | |
| v | | | | |
| w | | | | |
| x | | | | |
| y | ẏ | | | |
| z | ż | | | |
| Punctuation | . | , | : | ; | ? | – | + | = | > | < |
| 0-9 | 0 | 1 | 2 | 3 | 4 | 5 | 6 | 7 | 8 | 9 |
| Symbols | @ | & | / | % | ( | ) | * | ' | # | \ |

TABLE 10

Country Norway  Language Norwegian

Additional local language characters in order of priority

| Example A | À | Á | Â | Ä |
|---|---|---|---|---|
| A | À | Æ | | |
| B | | | | |
| C | | | | |
| D | | | | |
| E | È | É | | |
| F | | | | |
| G | | | | |
| H | | | | |
| I | | | | |

TABLE 10-continued

Country Norway  Language Norwegian

Additional local language characters in order of priority

| Example A | À | Á | Â | Ä |
|---|---|---|---|---|
| J | | | | |
| K | | | | |
| L | | | | |
| M | | | | |
| N | | | | |
| O | Ø | | | |
| P | | | | |
| Q | | | | |
| R | | | | |
| S | | | | |
| T | | | | |
| U | | | | |
| V | | | | |
| W | | | | |
| X | | | | |
| Y | | | | |
| Z | | | | |
| a | à | æ | | |
| b | | | | |
| c | | | | |
| d | | | | |
| e | è | é | | |
| f | | | | |
| g | | | | |
| h | | | | |
| i | | | | |
| j | | | | |
| k | | | | |
| l | | | | |
| m | | | | |
| n | | | | |
| o | ø | | | |
| p | | | | |
| q | | | | |
| r | | | | |
| s | | | | |
| t | | | | |
| u | | | | |
| v | | | | |
| w | | | | |
| x | | | | |
| y | | | | |
| z | | | | |
| Punctuation | ? | . | : | ; | < | > | ! |
| 0-9 | | | | | | | |
| Symbols | | | | | | | |

TABLE 11

Country: Slovakia  Language: Slovakian

Additional local language characters in order of priority

| Example A | À | Á | Â | Ä |
|---|---|---|---|---|
| A | À | Á | | |
| B | | | | |
| C | | | Č | |
| D | | | Ď | |
| E | Ė | | | |
| F | | | | |
| G | | | | |
| H | | | | |
| I | İ | | | |
| J | | | | |
| K | | | | |
| L | L̇ | Ľ | | |

TABLE 11-continued

Country: Slovakia   Language: Slovakian

Additional local language characters in order of priority

| Example A | À | Á | Ȧ | | Ä |
|---|---|---|---|---|---|
| M | | | | | |
| N | | Ṅ | | | |
| O | Ȯ | Ö | | | |
| P | | | | | |
| Q | | | | | |
| R | Ṙ | | | | |
| S | | Ṡ | | | |
| T | | Ṫ | | | |
| U | U̇ | | | | |
| V | | | | | |
| W | | | | | |
| X | | | | | |
| Y | Ẏ | | | | |
| Z | | Ż | | | |
| a | ȧ | | | | |
| b | | | | | |
| c | | c̈ | | | |
| d | | d̈ | | | |
| e | ė | | | | |
| f | | | | | |
| g | | | | | |
| h | | | | | |
| i | ı̇ | | | | |
| j | | | | | |
| k | | | | | |
| l | l̇ | ï | | | |
| m | | | | | |
| n | | n̈ | | | |
| o | ȯ | ö | | | |
| p | | | | | |
| q | | | | | |
| r | ṙ | | | | |
| s | | s̈ | | | |
| t | | ẗ | | | |
| u | u̇ | | | | |
| v | | | | | |
| w | | | | | |
| x | | | | | |
| y | ẏ | | | | |
| z | ż | | | | |
| Punctuation | . | , | : | ! | ? | · | + | = | > | < |
| 0-9 | 0 | 1 | 2 | 3 | 4 | 5 | 6 | 7 | 8 | 9 |
| Symbols | @ | & | / | % | ( | ) | * | ' | # | \ |

TABLE 12

Country Hungary   Language Hungarian

Additional local language characters in order of priority

| Example A | À | Á | Ȧ | Ä |
|---|---|---|---|---|
| A | | Á | | |
| B | | | | |
| C | | | | |
| D | | | | |
| E | | É | | |
| F | | | | |
| G | | | | |
| H | | | | |
| I | | Í | | |
| J | | | | |
| K | | | | |
| L | | | | |
| M | | | | |
| N | | | | |
| O | | Ó | Ö | Ő |

TABLE 12-continued

Country Hungary   Language Hungarian

Additional local language characters in order of priority

| Example A | À | Á | Ȧ | Ä |
|---|---|---|---|---|
| P | | | | |
| Q | | | | |
| R | | | | |
| S | | | | |
| T | | | | |
| U | | Ú | Ü | Ű |
| V | | | | |
| W | | | | |
| X | | | | |
| Y | | | | |
| Z | | | | |
| a | | á | | |
| b | | | | |
| c | | | | |
| d | | | | |
| e | | é | | |
| f | | | | |
| g | | | | |
| h | | | | |
| i | | í | | |
| j | | | | |
| k | | | | |
| l | | | | |
| m | | | | |
| n | | | | |
| o | | ó | ö | ő |
| p | | | | |
| q | | | | |
| r | | | | |
| s | | | | |
| t | | | | |
| u | | ú | ü | ű |
| v | | | | |
| w | | | | |
| x | | | | |
| y | | | | |
| z | | | | |

TABLE 13

Country Finland   Language Finnish

Additional local language characters in order of priority

| Example A | À | Á | Ȧ | Ä |
|---|---|---|---|---|
| A | Ä | Å | Á | |
| B | | | | |
| C | | | | |
| D | | | | |
| E | É | "euro" | | |
| F | | | | |
| G | | | | |
| H | | | | |
| I | | | | |
| J | | | | |
| K | | | | |
| L | | | | |
| M | | | | |
| N | | | | |
| O | Ö | | | |
| P | | | | |
| Q | | | | |
| R | | | | |
| S | | | | |
| T | | | | |
| U | | | | |

TABLE 13-continued

Country Finland  Language Finnish

Additional local language characters in order of priority

| Example A | À | Á | Â | Ä |
|---|---|---|---|---|
| V | | | | |
| W | | | | |
| X | | | | |
| Y | | | | |
| Z | | | | |
| a | ä | à | á | |
| b | | | | |
| c | | | | |
| d | | | | |
| e | é | "euro" | | |
| f | | | | |
| g | | | | |
| h | | | | |
| i | | | | |
| j | | | | |
| k | | | | |
| l | | | | |
| m | | | | |
| n | | | | |
| o | ö | | | |
| p | | | | |
| q | | | | |
| r | | | | |
| s | | | | |
| t | | | | |
| u | | | | |
| v | | | | |
| w | | | | |
| x | | | | |
| y | | | | |
| z | | | | |
| Punctuation | ? | . | : | ; | < | > | ! |
| 0-9 | | | | |
| Symbols | @ | & | % | = | + | − | "euro" |

TABLE 14

Country France  Language French

Additional local language characters in order of priority

| Example A | À | Á | Â | Ä |
|---|---|---|---|---|
| A | À | Ä | | |
| B | | | | |
| C | Ç | | | |
| D | | | | |
| E | É | È | Ê | Ë |
| F | | | | |
| G | | | | |
| H | | | | |
| I | Î | Ï | | |
| J | | | | |
| K | | | | |
| L | | | | |
| M | | | | |
| N | | | | |
| O | Ô | | | |
| P | | | | |
| Q | | | | |
| R | | | | |
| S | | | | |
| T | | | | |
| U | Ù | Û | Ü | |
| V | | | | |
| W | | | | |
| X | | | | |
| Y | | | | |

TABLE 14-continued

Country France  Language French

Additional local language characters in order of priority

| Example A | À | Á | Â | Ä |
|---|---|---|---|---|
| Z | | | | |
| a | à | â | | |
| b | | | | |
| c | ç | | | |
| d | | | | |
| e | é | è | ê | ë |
| f | | | | |
| g | | | | |
| h | | | | |
| i | î | ï | | |
| j | | | | |
| k | | | | |
| l | | | | |
| m | | | | |
| n | | | | |
| o | ô | | | |
| p | | | | |
| q | | | | |
| r | | | | |
| s | | | | |
| t | | | | |
| u | ù | û | ü | |
| v | | | | |
| w | | | | |
| x | | | | |
| y | | | | |
| z | | | | |
| Punctuation | ? | . | : | ; | < | > | ! |
| 0-9 | | | | |
| Symbols | | | | |

TABLE 15

Country Spain + Portugal  Language Spanish + Portuguese

| Example | Additional local language characters in order of priority | | | |
|---|---|---|---|---|
| A | À | Á | Â | Ä |
| A | À | Á | Ä | Â |
| B | | | | |
| C | Ç | | | |
| D | | | | |
| E | É | È | | |
| F | | | | |
| G | | | | |
| H | | | | |
| I | Í | Ì | Î | |
| J | | | | |
| K | | | | |
| L | | | | |
| M | | | | |
| N | Ñ | (without this character the product can not be sold in spain (legal request)) | | |
| O | Ó | Ö | | |
| P | | | | |
| Q | | | | |
| R | | | | |
| S | | | | |
| T | | | | |
| U | Ú | Ü | | |
| V | | | | |
| W | | | | |
| X | | | | |
| Y | | | | |
| Z | | | | |
| a | à | á | â | ä |

TABLE 15-continued

| | Country Spain + Portugal Language Spanish + Portuguese | | | | | | | | |
|---|---|---|---|---|---|---|---|---|---|
| Example | Additional local language characters in order of priority | | | | | | | | |
| A | À | Á | Ã | | Ä | | | | |
| b | | | | | | | | | |
| c | ç | | | | | | | | |
| d | | | | | | | | | |
| e | é | è | | | | | | | |
| f | | | | | | | | | |
| g | | | | | | | | | |
| h | | | | | | | | | |
| i | í | ì | ï | | | | | | |
| j | | | | | | | | | |
| k | | | | | | | | | |
| l | | | | | | | | | |
| m | | | | | | | | | |
| n | ñ | (legal request) | | | | | | | |
| o | ó | ö | | | | | | | |
| p | | | | | | | | | |
| q | | | | | | | | | |
| r | | | | | | | | | |
| s | | | | | | | | | |
| t | | | | | | | | | |
| u | ú | ü | | | | | | | |
| v | | | | | | | | | |
| w | | | | | | | | | |
| x | | | | | | | | | |
| y | | | | | | | | | |
| z | | | | | | | | | |
| Punctu-ation | ? ? | . . | : : | ; ; | ¿ | < < | \| | > > | ! ! |
| 0-9 | 0 | 1 | 2 | 3 | 4 | 5 | 6 | 7 | 8 | 9 |
| Symbols | € | $ | & | % | / | . | * | | |

TABLE 16

| | Country Netherlands Language Dutch | | | | |
|---|---|---|---|---|---|
| Example | Additional local language characters in order of priority | | | | |
| A | À | Á | Â | | Ä |
| A | À | Á | Ä | Â | Æ |
| B | | | | | |
| C | ç | Ć | | | |
| D | | | | | |
| E | É | È | Ë | Ê | |
| F | | | | | |
| G | | | | | |
| H | | | | | |
| I | Í | Ï | | | |
| J | | | | | |
| K | | | | | |
| L | Ĺ | | | | |
| M | | | | | |
| N | Ñ | Ń | | | |
| O | Ò | Ó | Ö | Ô | Ø | Œ |
| P | | | | | |
| Q | | | | | |
| R | | | | | |
| S | β | | | | |
| T | | | | | |
| U | Ù | Ú | Ü | Ű | |
| V | | | | | |
| W | | | | | |
| X | | | | | |
| Y | | | | | |
| Z | | | | | |
| a | à | á | ä | â | æ |
| b | | | | | |

TABLE 16-continued

| | Country Netherlands Language Dutch | | | | | | | | |
|---|---|---|---|---|---|---|---|---|---|
| Example | Additional local language characters in order of priority | | | | | | | | |
| A | À | Á | Â | | Ä | | | | |
| c | ç | | | | | | | | |
| d | ď | | | | | | | | |
| e | è | é | ë | ê | | | | | |
| f | | | | | | | | | |
| g | | | | | | | | | |
| h | | | | | | | | | |
| i | ï | í | | | | | | | |
| j | | | | | | | | | |
| k | | | | | | | | | |
| l | ï | | | | | | | | |
| m | | | | | | | | | |
| n | ñ | | | | | | | | |
| o | ò | ó | ö | ô | ø | œ | | | |
| p | | | | | | | | | |
| q | | | | | | | | | |
| r | | | | | | | | | |
| s | β | | | | | | | | |
| t | ť | | | | | | | | |
| u | ù | ú | ü | û | | | | | |
| v | | | | | | | | | |
| w | | | | | | | | | |
| x | | | | | | | | | |
| y | | | | | | | | | |
| z | | | | | | | | | |
| Punctuation | ? | . | : | ; | | < | ( ) | > | ! |
| 0-9 Symbols | 0 | 1 | 2 | 3 | 4 | 5 | 6 | 7 | 8 | 9 |

TABLE 17

| | Country Denmark Language Danish | | | | | |
|---|---|---|---|---|---|---|
| Example | Additional local language characters in order of priority | | | | | |
| A | À | Á | Ȧ | | Ä | |
| A | À | Á | Â | Ã | Å | Ä |
| B | β | | | | | |
| C | Ç | Ć | Ċ | | | |
| D | Đ | Ď | | | | |
| E | É | È | Ė | Ë | Ę | Ê |
| F | | | | | | |
| G | Ġ | | | | | |
| H | | | | | | |
| I | Ï | Ĭ | Í | İ | | |
| J | | | | | | |
| K | | | | | | |
| L | | | | | | |
| M | | | | | | |
| N | Ń | Ñ | Ń | | | |
| O | Ò | Ó | Ö | Ö | Œ | |
| P | | | | | | |
| Q | | | | | | |
| R | Ř | Ŕ | | | | |
| S | Ş | Ś | Ṡ | β | | |
| T | Ţ | | | | | |
| U | Ü | Ú | Ů | Ü | | |
| V | | | | | | |
| W | | | | | | |
| X | | | | | | |
| Y | Ý | Ÿ | Ẏ | | | |
| Z | Ż | Ź | Ż | | | |
| a | à | á | ä | ã | ą | ä |
| b | β | | | | | |
| c | ç | ć | ċ | | | |
| d | đ | ď | | | | |
| e | é | è | ė | ë | ę | ê |
| f | | | | | | |

TABLE 17-continued

Country Denmark  Language Danish

Additional local language characters in order of priority

| Example A | À | Á | Ȧ | Ä |
|---|---|---|---|---|
| g | | | | |
| h | ġ | | | |
| i | ï | í | ì | ı |
| j | | | | |
| k | | | | |
| l | | | | |
| m | | | | |
| n | ṅ | ń | ǹ | |
| o | ö | ó | ò | ŏ |
| p | ṗ | | | |
| q | | | | |
| r | ṙ | ŕ | | |
| s | ſ | ś | š | β |
| t | ṫ | | | |
| u | ü | ú | ù | ŭ |
| v | | | | |
| w | | | | |
| x | | | | |
| y | ẏ | ÿ | | |
| z | ź | ẑ | ż | |
| Punctuation | ? | . | : | ; . < > ! |
| 0-9 | | | | |
| Symbols | | | | |

The invention claimed is:

1. A printing device for printing labels comprising:
a memory arranged to store one or more letter sets, each letter set including at least a principal letter and at least one additional letter comprising an accented version of the principal letter;
a user input having letter selection keys configured to permit selection of a letter set to define an image to be printed by the printing device, a single letter or a single letter set being associated with a respective letter selection key and a key which controls if a selected letter is printed in upper case or lower case; and
a controller for accessing letters from the memory to be printed which correspond to letters selected at the user input;
wherein the printing device is configured such that an initial actuation of a letter selection key, by actuating the letter selection key and then within a predetermined time commencing with an initiation of activation of the letter selection key, releasing the letter selection key, selects the principal letter in the selected letter set; and
by maintaining the initial actuation of the letter selection key until after the predetermined time commencing with the initiation of activation of the letter selection key has elapsed and only then releasing the letter selection key, selects an accented version of the principal letter.

2. A printing device according to claim 1, wherein further accented versions of the principal letter are associated with the principal letter and wherein a subsequent actuation of the letter selection key, after the letter selection key is released after the predetermined time commencing with the initiation of activation of the letter selection key, selects one of said further accented versions of the principal letter.

3. A printing device according to claim 1, further comprising a display configured to display selected letters.

4. A printing device according to claim 3, wherein the display is further configured, before the end of the predetermined time, to temporarily display the principal letter which would be selected if the maintaining the initial actuation until after the predetermined time has elapsed did not occur.

5. A printing device according to claim 1, wherein the key which controls if a selected letter is printed in upper case or lower case comprises a caps lock key, wherein if the caps lock key is activated, subsequent activation of one or more letter selection keys selects uppercase letters.

6. A printing device according to claim 5, wherein the caps lock key is a toggle key such that if the caps lock key is activated again, subsequent activation of one or more letter keys selects lowercase letters.

7. A printing device according to claim 1, wherein the key which controls if a selected letter is printed in upper case or lower case comprises a shift key, wherein if the shift key is held activated, subsequent activation of one or more letter selection keys selects uppercase letters.

8. A printing device according to claim 1, wherein the memory stores a plurality of letter groups, each letter group comprising one or more letter sets.

9. A printing device according to claim 8, wherein the principal letters of different groups are identical.

10. A printing device according to claim 9, wherein the principal letters in one group has at least one accented version of said principal letter which differs from at least one accented version of said principal letter in another group.

11. A printing device according to claim 8, wherein some principal letters of some groups have no additional letter associated with them and these principal letters differ between groups.

12. A printing device according to claim 8, wherein the letter sets of each letter group include an alphabet and the additional letters are accented versions of the principal letter which exist in the alphabet which the letter sets include.

13. A printing device according to claim 12, wherein each alphabet corresponds to a different language.

14. A printing device according to claim 8, wherein the user input further comprises a group selection key for choosing a letter group from which to create an image.

15. A method of printing characters on a label comprising:
storing in a memory one or more letter sets, each letter set including at least a principal letter and an additional letter comprising an accented version of the letter;
using letter selection keys to select a letter set to define an image to be printed by the printing device, a single letter or a single letter set being associated with a respective letter selection key and a key which controls if a selected letter is printed in upper case or lower case being provided; and
accessing letters from the memory to be displayed and printed which correspond to letters selected;
wherein an initial actuation of a letter selection key, by actuating the letter selection key and then within a predetermined time commencing with an initiation of activation of the letter selection key, releasing the letter selection key, selects the principal letter in the selected letter set; and
wherein maintaining the initial actuation of the letter selection key until after the predetermined time commencing with the initiation of activation of the letter selection key has elapsed and only then releasing the letter selection key, selects an accented version of the principal letter.

16. The method of claim 15, wherein in storing in the memory the one or more letter sets, each letter set includes further accented versions of the principal letter, and wherein a subsequent actuation of the letter selection key, after the letter selection key is released after the predetermined time commencing with the initiation of activation of the letter selection key, selects one of said further accented versions of the principal letter.

* * * * *